(12) United States Patent
Hijikata

(10) Patent No.: US 9,985,560 B2
(45) Date of Patent: *May 29, 2018

(54) MOTOR CONTROLLER AND METHOD FOR CONTROLLING MOTOR

(71) Applicant: MINEBEA CO., LTD., Kitasaku-gun, Nagano (JP)

(72) Inventor: Hidetoshi Hijikata, Hamamatsu (JP)

(73) Assignee: Minebea Co., Ltd., Nagano (JP)

( * ) Notice: Subject to any disclaimer, the term of this patent is extended or adjusted under 35 U.S.C. 154(b) by 97 days.

This patent is subject to a terminal disclaimer.

(21) Appl. No.: 15/132,890

(22) Filed: Apr. 19, 2016

(65) Prior Publication Data

US 2016/0359437 A1 Dec. 8, 2016

(30) Foreign Application Priority Data

Jun. 5, 2015 (JP) .................................. 2015-114666

(51) Int. Cl.
*H02P 6/00* (2016.01)
*H02P 6/182* (2016.01)
*H02P 6/08* (2016.01)
*H02P 8/12* (2006.01)
*H02P 6/15* (2016.01)

(52) U.S. Cl.
CPC ............. *H02P 6/182* (2013.01); *H02P 6/085* (2013.01); *H02P 6/157* (2016.02); *H02P 8/12* (2013.01)

(58) Field of Classification Search
USPC ........ 318/400.35, 400.26, 400.29, 667, 254.2
See application file for complete search history.

(56) References Cited

U.S. PATENT DOCUMENTS 6,451,055 B1 * 9/2002 Weiss .................. A61M 1/1086
  623/3.27
7,545,369 B1 * 6/2009 Lan ...................... G09G 3/3406
  315/209 R
2006/0152947 A1 * 7/2006 Baker ................. H02M 1/4241
  363/16

FOREIGN PATENT DOCUMENTS

JP 10-080194 A 3/1998

* cited by examiner

*Primary Examiner* — Eduardo Colon Santana
*Assistant Examiner* — Iftekhar Mustafa
(74) *Attorney, Agent, or Firm* — Carrier Blackman & Associates, P.C.; Joseph P. Carrier; Jeffrey T. Gedeon

(57) ABSTRACT

A controller of a motor controller operates to perform a process including: controlling the H bridge circuit to switch to the charge mode; controlling the H bridge circuit to switch to the high-dissipation mode when the zero-cross detector detects that the back electromotive force voltage of the motor coil connected to a phase of the H bridge circuit shortly before the H bridge circuit is zero-crossed; controlling the H bridge circuit to switch to the low-dissipation mode after a predetermined time has elapsed; and controlling the H bridge circuit to switch to the free mode when the motor current detector detects that the motor current flowing in the motor coil connected to the H bridge circuit flows in a direction opposite to that in the charge mode.

6 Claims, 11 Drawing Sheets

CHARGE MODE

HIGH-DISSIPATION MODE

LOW-DISSIPATION MODE

LOW-DISSIPATION MODE

FREE MODE

CHARGE MODE

HIGH-DISSIPATION MODE

FREE MODE

MOTOR CONTROLLER AND METHOD FOR CONTROLLING MOTOR

BACKGROUND OF THE INVENTION

1. Field of the Invention

The present invention relates to a motor controller and a method for controlling a stepping motor.

2. Description of the Related Art

A method for driving an inductive load is disclosed in JP-A-H10(1998)-080194, which combines regenerative electric current and flowing electric current to cause switching current flowing in an inductive load to be appropriate.

In paragraph 0023 of JP-A-H10-080194, it is described that "an H-bridge circuit is configured to allow current to flow in an inductive load in opposite directions, that is, in forward and reverse directions, with four semiconductor switching elements and fly-wheel diodes anti-parallel connected to the semiconductor switching elements, respectively, so that, when a current supply operation is performed to supply current from a power source to the inductive load, two of the semiconductor switching elements take a conduction state to cause current to flow in the inductive load in a desired direction, and thereby the current flowing in the inductive load is increased by such a current supply operation, with the result that, if current is equal to or greater than a predetermined reference current value, energy accumulated in the inductive load is released to control the current flowing in the inductive load."

In paragraph 0024, it is described that "then, a control may be performed by two kinds of operations: one of them is performed such that one of the semiconductor switching elements takes the conduction state to form a closed current path with the semiconductor switching element that is in the conduction state and one fly-wheel diode, by the energy accumulated in the inductive load and thereby cause current to flow in the closed current path, and the other is performed such that all of the four semiconductor switching elements are interrupted to cause current to flow in the two fly-wheel diodes by the energy accumulated in the inductive load and thereby charge power."

The former operation of causing the current to flow in the closed current path is referred to as a communication control.

Further, in paragraph 0026 of JP-A-H10(1998)-080194, it is described that "a predetermined frequency of driving cycle is made and a current supply operation is started by initiating the driving cycle, so that, if current flowing in the inductive load is equal to or greater than a predetermined value during a current supply operation, the current supply operation is terminated and energy accumulated in the inductive load is released, and, assuming that a predetermined period after the driving cycle is started is defined as a power regeneration period and a period from the end of the power regeneration period to the end of the driving cycle is defined as a current period, a power regenerating operation is performed within the power regeneration period after the current supply operation is terminated, and the communication control is performed within the current period."

A motor is rotated by driving a plurality of drive coils in opposite directions (bipolar) and changing a phase to apply current. If switching elements provided on opposite sides of the coils, namely, a motor supply voltage side (high side) and a ground side (low side) are simultaneously turned off when the motor is rotated, a high voltage of flyback pulse (kick back) is induced by energy reserved in the coils.

A coil current is maximized at the time of the phase change. If the flyback pulse is induced, the coil current is discharged to the ground by parasitic transistor effect due to a Complementary MOS (CMOS) manufacturing process of an Application Specific Integrated Circuit (ASIC), thus causing a power dissipation. Therefore, the ASIC generates heat, so that an operation is limited at high temperature.

In a period when the flyback pulse is induced, the high-side switching elements are temporarily turned on instead of turning all the switching elements off, to cause the current discharged to the ground to flow through the high-side switching elements and thereby flow back to a supply power source of the motor. In this way, it is possible to decrease a power dissipation.

However, since a period when the flyback pulse is induced varies depending on a drive voltage of the motor, a drive load of the motor and a rotating speed, it is difficult to appropriately control a flow time depending on a motor operation. Thus, a case where a time for a communication control is not optimum may occur, so that a power dissipation may undesirably occur.

For example, if the time for the communication control is shorter than a period when the flyback pulse is induced, current flowing in the switching elements flows through a fly-wheel diode connected in parallel thereto to be returned, thus causing a power dissipation. In contrast, if the time for the communication control is shorter than the period when the flyback pulse is induced, an inductive load is short-circuited to act as a brake against the rotation of the motor, so that it is further difficult to control the speed of the motor, and it is impossible to measure a back electromotive force voltage for detecting a stall of synchronism after the speed of the motor is controlled.

Further, it is possible to reduce the effect of heat generation by mounting a heat sink to an ASIC and increasing a size of a substrate and an amount of copper. However, this method is problematic in that the size of the substrate or a case as well as manufacturing cost is increased.

An external attaching diode is added to every output terminal of the motor, and thereby coil current flows back to the motor power source without being affected by the parasitic transistor effect, so that it is possible to decrease a power dissipation. However, this method is likewise problematic in that the size of the substrate as well as manufacturing cost is increased because of increases in mounting part point and mounting area.

SUMMARY OF THE INVENTION

One of objects of the present invention is to provide a motor controller and a method for controlling a stepping motor that are capable of reducing a power dissipation by returning current discharged to a ground to a power source.

According to an illustrative embodiment of the present invention, there is provided a motor controller including: an H bridge circuit having switching elements, fly-wheel diodes, and half bridges connected to motor coils provided in the motor; a current detector that detects motor current flowing in the motor coil; a zero-cross detector that detects a zero-cross of a back electromotive force voltage of each of the motor coils; and a controller that operates to control the H bridge circuit to operate in one of operation modes including a charge mode, a high-dissipation mode, a low-dissipation mode and a free mode by activating the switching elements of the H bridge based on the motor current detected by the current detector. The H bridge circuit increases the motor current flowing in each of the motor coils in the charge mode. The H bridge circuit operates with high energy dissipation and a flyback pulse of each of the motor coils is induced in the high-dissipation mode. The H bridge circuit operates with low energy dissipation that is lower than in the high-dissipation mode in the low-dissipation mode. The H bridge circuit operates to allow the zero-cross detector to detect the zero-cross of the back electromotive force voltage of each of the motor coils after the flyback pulse of each of the motor coils is decreased. The controller further operates to perform a process including: controlling the H bridge circuit to switch to the charge mode; controlling the H bridge circuit to switch to the high-dissipation mode when the zero-cross detector detects that the back electromotive force voltage of the motor coil connected to a phase of the H bridge circuit shortly before the H bridge circuit is zero-crossed; controlling the H bridge circuit to switch to the low-dissipation mode after a predetermined time has elapsed; and controlling the H bridge circuit to switch to the free mode when the motor current detector detects that the motor current flowing in the motor coil connected to the H bridge circuit flows in a direction opposite to that in the charge mode.

According to another illustrative embodiment of the present invention, there is provided a method for controlling a motor with a motor controller including: an H bridge circuit having switching elements, fly-wheel diodes, and half bridges connected to motor coils provided in the motor; a current detector that detects motor current flowing in the motor coil; a zero-cross detector that detects a zero-cross of a back electromotive force voltage of each of the motor coils; and a controller that operates to control the H bridge circuit to operate in one of operation modes including a charge mode, a high-dissipation mode, a low-dissipation mode and a free mode by activating the switching elements of the H bridge based on the motor current detected by the current detector. The H bridge circuit increases the motor current flowing in each of the motor coils in the charge mode. The H bridge circuit operates with high energy dissipation and a flyback pulse of each of the motor coils is induced in the high-dissipation mode. The H bridge circuit operates with low energy dissipation that is lower than in the high-dissipation mode in the low-dissipation mode. The H bridge circuit operates to allow the zero-cross detector to detect the zero-cross of the back electromotive force voltage of each of the motor coils after the flyback pulse of each of the motor coils is decreased. The method includes: controlling the H bridge circuit to switch to the charge mode; controlling the H bridge circuit to switch to the high-dissipation mode when the zero-cross detector detects that the back electromotive force voltage of the motor coil connected to a phase of the H bridge circuit shortly before the H bridge circuit is zero-crossed; controlling the H bridge circuit to switch to the low-dissipation mode after a predetermined time has elapsed; and controlling the H bridge circuit to switch to the free mode when the motor current detector detects that the motor current flowing in the motor coil connected to the H bridge circuit flows in a direction opposite to that in the charge mode.

DETAILED DESCRIPTION

Hereinafter, embodiments of the present invention will be described in detail with reference to the accompanying drawings.

Figure 1:
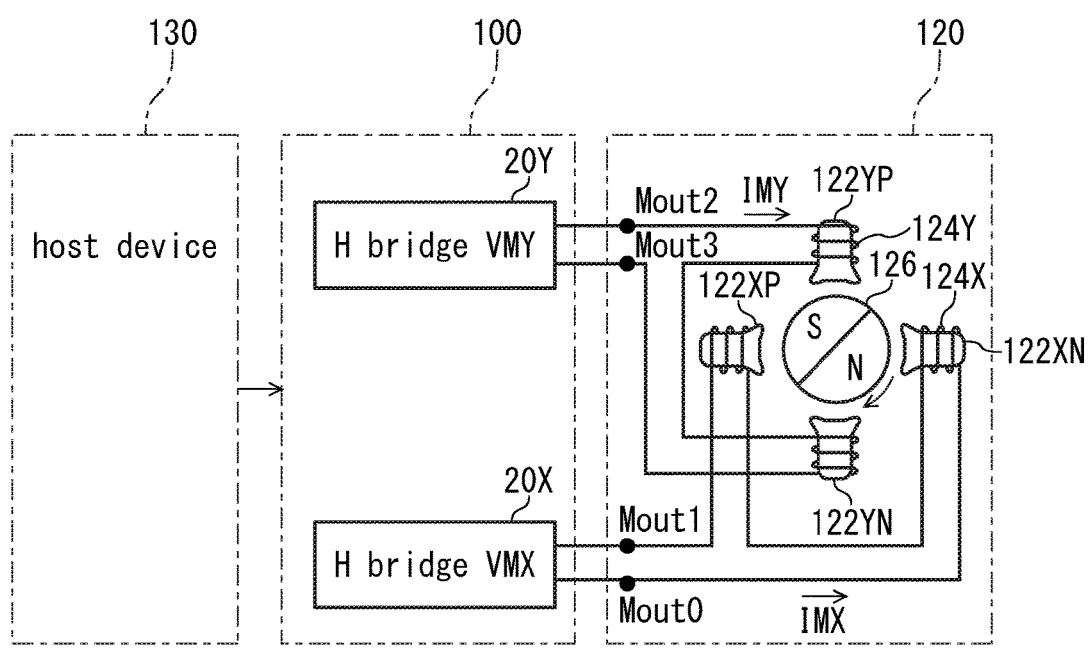
FIG. 1 is an entire block diagram illustrating a motor control system according to an embodiment and a comparative example.

FIG. 1 shows an overall block diagram of a motor controlling system according to an embodiment of the present invention.

In FIG. 1, a motor 120 is a bipolar two-phase stepping motor, and includes a rotor 126 that has a permanent magnet and is installed to be freely rotatable, and stators that are installed in four positions in a circumferential direction of the rotor 126. These stators are composed of stators 122XP and 122XN each having an X phase and stators 122YP and 122YN each having a Y phase. Coils are wound around the respective stators. The coils wound around the stators 122YP and 122YN are connected in series, so that both the coils are together referred to as a "coil 124Y" Likewise, the coils wound around the stators 122XP and 122XN are connected in series, so that both the coils are together referred to as a "coil 124X."

A host device 130 outputs a speed command signal for instructing a rotating speed of the motor 120. A motor controller 100 controls the drive of the motor 120 in response to the speed command signal. H-bridge circuits 20X and 20Y are installed in the motor controller 100 to apply a voltage VMX of the X phase and a voltage VMY of the Y phase to the coils 124X and 124Y, respectively.

One end of the coil 124X of the X phase is a connection point Mout0, while the other end is a connection point Mout1. The voltage VMX of the X phase is a difference between a voltage of the connection point Mout1 and a voltage of the connection point Mout0. In a coil current IMX of the X phase, a direction from the connection point Mout0 to the connection point Mout1 is set as a positive direction.

Further, one end of the coil 124Y of the Y phase is a connection point Mout2, while the other end is a connection point Mout3. The voltage VMY of the Y phase is a difference between a voltage of the connection point Mout3 and a voltage of the connection point Mout2. In a coil current IMY of the Y phase, a direction from the connection point Mout2 to the connection point Mout3 is set as a positive direction.

The motor controller 100 will be described in detail with reference to FIG. 2.

Figure 2:
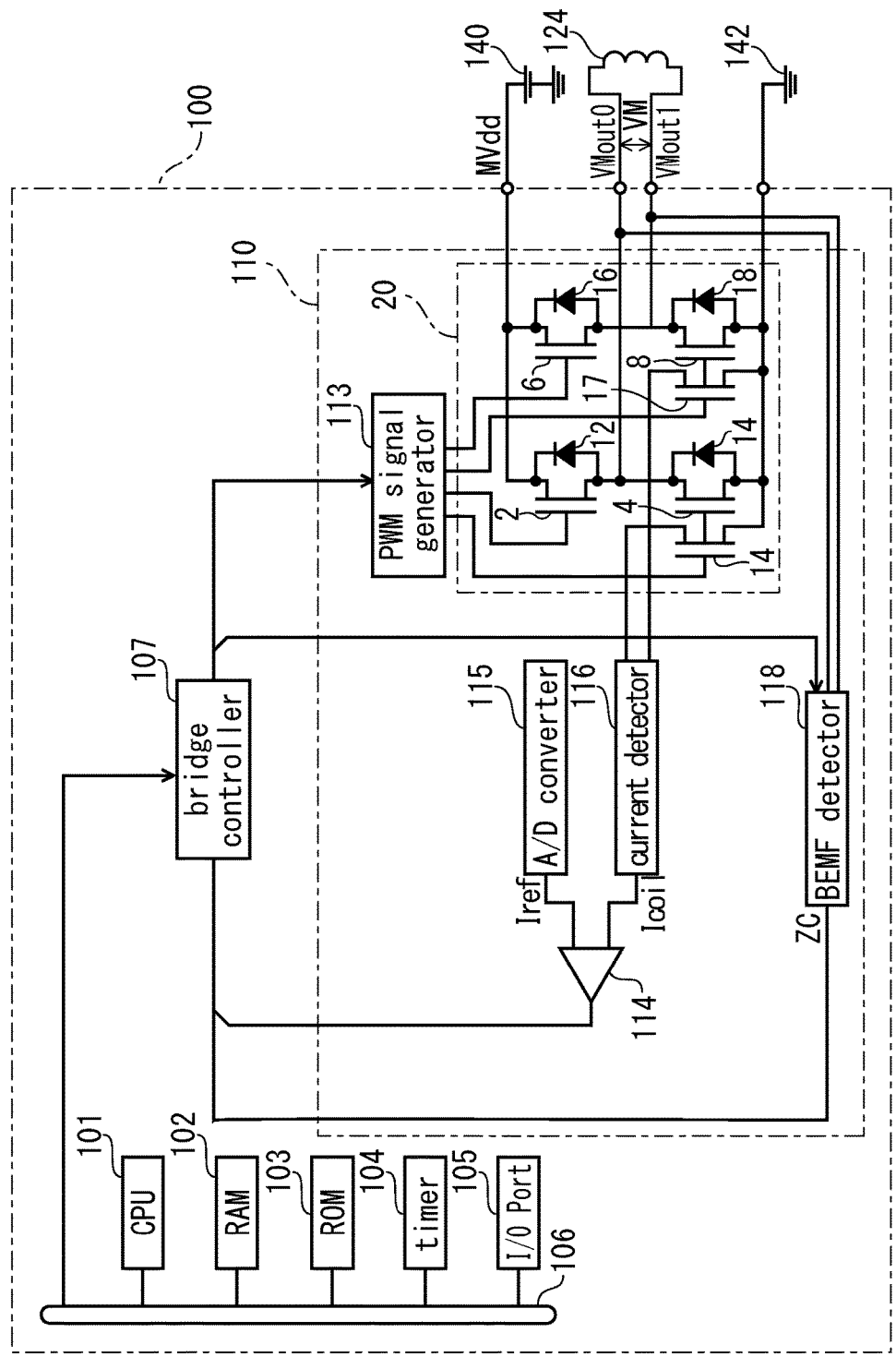
FIG. 2 is a detailed block diagram illustrating a motor controller according to the embodiment and the comparative example.

FIG. 2 is a detailed block diagram illustrating the motor controller according to the embodiment.

FIG. 1 shows two systems of coils 124X and 124Y and two systems of H-bridge circuits 20X and 20Y, while FIG. 2 shows one system of coil 124 and one system of H-bridge circuit 20.

A Central Processing Unit (CPU) 101 installed in the motor controller 100 controls each part through a bus 106, based on a control program stored in a read only memory (ROM) 103. A random access memory (RAM) 102 is used as a working memory of the CPU 101. A timer 104 measures a time elapsed from a reset timing, under the control of the CPU 101. An I/O Port 105 inputs and outputs signals between the host device 130 located at the upper position in FIG. 1 and other external apparatuses. A bridge controller 107 controls each part of the bridge control circuit 110, based on a command from the CPU 101.

The bridge control circuit 110 is configured as an integral integrated circuit. A PWM signal generator 113 provided in the bridge control circuit is based on a control by the bridge controller 107, generates a PWM signal and then supplies this signal to the H-bridge circuit 20. The H-bridge circuit 20 includes switching elements 2, 4, 6 and 8 that are composed of FETs (Field-Effect Transistors). The PWM signal is an on/off signal that is applied to the switching elements 2, 4, 6 and 8 as gate voltage. In the drawing, a lower terminal of each of the switching elements 2, 4, 6 and 8 becomes a source terminal, while an upper terminal thereof becomes a drain terminal.

The switching elements 2 and 4 are connected in series, and a DC power source 140 and a ground 142 are connected to the series circuit, so that a predetermined power voltage MVdd is applied thereto. Likewise, the switching elements 6 and 8 are connected in series, so that the power voltage MVdd is applied to the series circuit. Diodes 12, 14, 16 and 18 are diodes (fly-wheel diodes) for a return current, and are connected in parallel to the switching elements 2, 4, 6 and 8. The switching elements 15 and 17 are provided for the purpose of detecting current, and serves as a part of a current mirror circuit together with the switching elements 4 and 8, respectively. Thus, current that is proportional to the current flowing in the switching element 4, 8 flows in each switching element 15 or 17.

A voltage VMout0 of a connecting point Mout0 between the switching elements 2 and 4 is applied to one end of the coil 124X of the motor 120. Further, a voltage VMout1 of a connecting point Mout1 between the switching elements 6 and 8 is applied to the other end of the coil 124. Thus, a motor voltage VM (=voltage VMout0−VMout1) that is equal to a difference between the voltage VMout0 and the voltage VMout1 is applied to the coil 124. The motor voltage VM is actually the voltage VMX of the X phase and the voltage VMY of the Y phase, which are illustrated in FIG. 1. Further, a voltage VMout2 is applied to the coil 124Y of the Y phase, and a voltage VMout3 is applied to the other end of the coil 124Y of the Y phase.

A current detector 116 measures a current value flowing in the switching element 15, 17 in a current direction, thus outputting a current measurement value Icoil of current flowing in the coil 124. A D/A converter 115 receives a digital value of a current reference value Iref from the bridge controller 107 and changes it into an analogue value. A comparator 114 compares the current measurement value Icoil of the analogue value with the current reference value Iref, and then outputs a "1" signal if the current measurement value is equal to or more than the current reference value and outputs a "0" signal in other cases.

The voltages VMout0 and VMout1 are also supplied to a back electromotive force (BEMF) detector 118. The BEMF detector 118 is a zero-cross detecting means. When the motor voltage VM is the back electromotive force voltage, namely, in a period when no voltage is applied from the H-bridge circuit 20, a voltage direction is replaced (zero-cross) and thus a flag ZC is output.

Figure 8A:
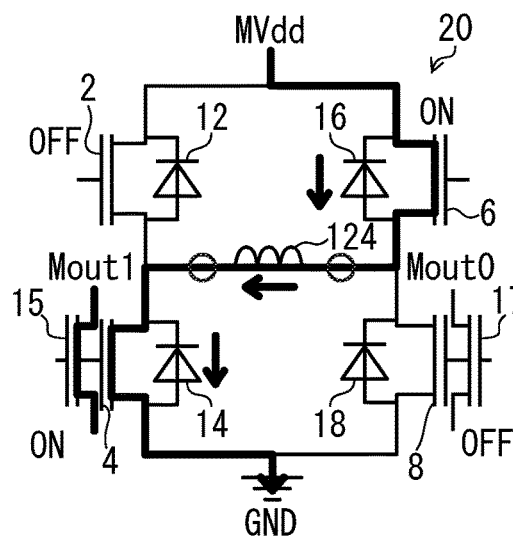
FIGS. 8A-8C are explanatory views illustrating operation modes of an H-bridge circuit according to a comparative example.
Figure 8B:
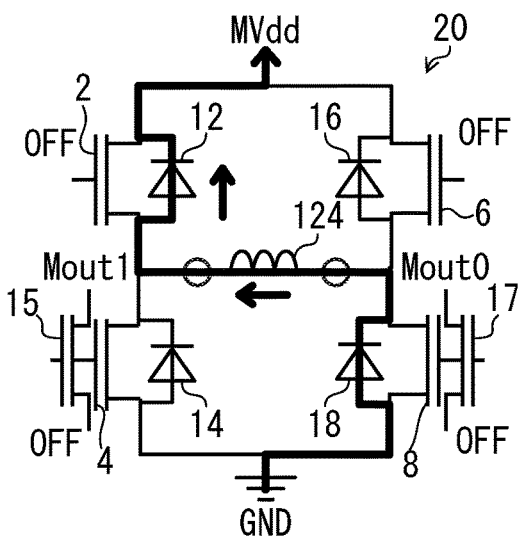
Figure 8C:
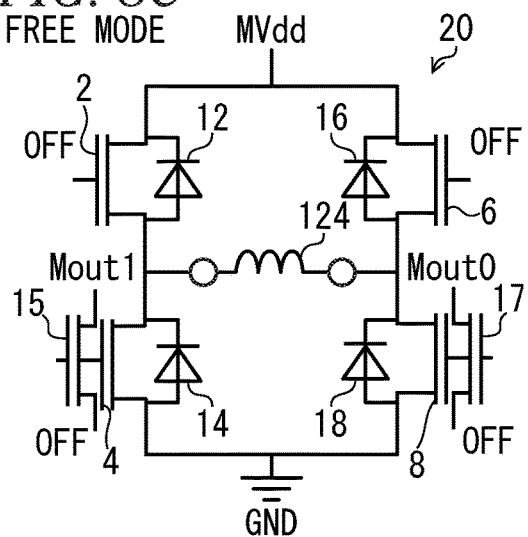

FIGS. 8A to 8C are explanatory views illustrating an operating mode of the H-bridge circuit 20 according to the comparative example.

FIG. 8A is a view showing the operation of the H-bridge circuit 20 in a charge mode.

When a motor current is applied to the coil 124, two diagonally opposing switching elements are turned on. In the illustrated example, the switching elements 4 and 6 are on, while switching element 2 and 8 are off. In this state, the motor current flows through the switching element 6, the coil 124 and the switching element 4 in a direction shown by a bold line. The period when the H-bridge circuit 20 is operated in the charge mode is referred to as a "current applying period."

Even if the gate voltage of any of the switching elements is turned off, an associated switching element temporarily remains in the ON state by a parasitic capacity of the associated switching element. Hence, if the diagonally opposing switching elements 4 and 6 are changed from the ON state to the OFF state and simultaneously the other diagonally opposing switching elements 2 and 8 are changed from the OFF state to the ON state, the switching elements 2 and 4 connected in series are momentarily on to be shot through. Thus, short-circuit occurs between the DC power source 140 and the ground 142, so that the switching elements 2 and 4 may be broken. The same applies to the switching elements 6 and 8. In order to prevent it, the H-bridge circuit 20 is set as a "high-dissipation mode" of FIG. 8B, subsequent to the "charge mode."

That is, if the switching elements 4 and 6 are off while the switching elements 2 and 8 are off, an operation is transferred from the charge mode of FIG. 8A to the high-dissipation mode of FIG. 8B. A period when the H-bridge circuit 20 is operated in the high-dissipation mode is referred to as the "high-dissipation period."

FIG. 8B is a view showing the operation of the H-bridge circuit 20 in the high-dissipation mode.

In the high-dissipation mode, the H-bridge circuit 20 turns all of the switching elements 2, 4, 6 and 8 off. At this time, current flows through the diode 18, the coil 124 and the diode 12 in a direction shown by a bold line, by energy reserved in the coil 124. That is, energy accumulated in the coil 124 causes current to flow in a closed circuit formed by the high-side diode 12 that is located in a motor-current flowing direction shown by a bold line and the low-side diode 18 that is located in a direction opposite to the motor-current flowing direction shown by a bold line. In this high-dissipation mode, a power dissipation occurs due to a voltage drop Vf in the forward directions of the diodes 12 and 18. If the H-bridge circuit 20 is formed by a CMOS process, the current leaks to the ground 142 due to the parasitic transistor effect in the high-dissipation mode, thus generating heat and consequently increasing an energy dissipation.

If the coil 124 sufficiently releases energy from the high-dissipation mode of FIG. 8B, no current flows.

FIG. 8C is a view illustrating an operation of the H-bridge circuit 20 in a free mode.

In the free mode, the H-bridge circuit 20 turns all the switching elements 2, 4, 6 and 8 off. At this time, the energy stored in the coil 124 is released. In this free mode, the back electromotive force voltage appears in the coil 124. The bridge control circuit 110 shifts to a next quadrant by detecting the zero-cross of the back electromotive force voltage of the motor 120 in the free period. Further, the H-bridge circuit 20 shifts to the charge mode of FIG. 8A again.

Figure 9:
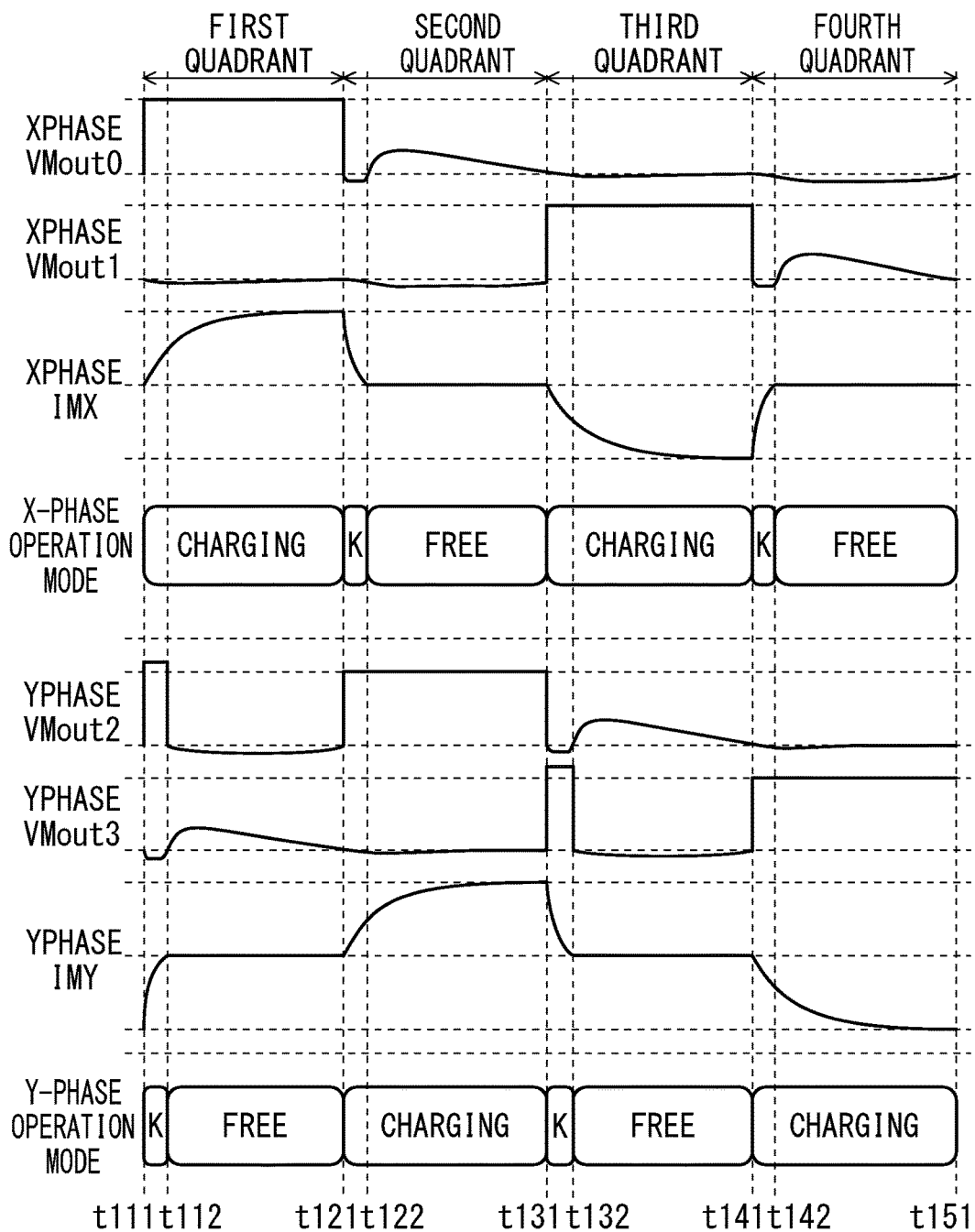
FIG. 9 is a waveform chart illustrating current sequences of an X phase and a Y phase of the H-bridge circuit according to the comparative example.

FIG. 9 is a waveform chart illustrating current sequences of the X phase and the Y phase of the H-bridge circuit 20.

The waveform chart of FIG. 9 shows the voltage VMout0 of the X phase in a bold line and the setting of the switching element 6 in a bold broken line. This shows the voltage VMout1 of the X phase in the bold line and the setting of the switching element 2 in a bold broken line. This bold broken line is described in an H level when each switching element is turned on and in an L level when each switching element is turned off. Further, the coil current IMX and the operating mode of the X phase are also shown in FIG. 9.

Moreover, the waveform chart of FIG. 9 shows the voltage VMout2 of the Y phase in a solid line and the setting of the high-side switching element of a leg on the connection point Mout2 in a broken line. This shows the voltage VMout3 of the Y phase in a solid line and the setting of the high-side switching element of a leg on the connection point Mout3 in a broken line. Further, the coil current IMY and the operating mode of the Y phase are also shown in FIG. 9.

The motor controller 100 of the comparative example drives the motor 120 in one phase excitation in response to motor drive voltage and load. The motor 120 rotates by constituting one electrical angle with four phases (quadrants). If the X phase is the current applying period (see FIG. 8A) in any quadrant, the Y phase takes the free period (see FIG. 8C) after the high-dissipation period (see FIG. 8B).

When the motor drive voltage is high or the load is small, the rotating speed of the motor 120 is increased and the maximum current of the coil 124 is reduced. If the motor drive load is small, a flyback pulse time is shortened. The back electromotive force voltage is generated in the free period of each phase. This back electromotive force voltage is high if the motor rotating speed is fast, and becomes 0 [V] at the time of being stopped, so that it may be used to detect the stall of synchronism.

In FIG. 9, the first quadrant is a period from time t111 to time t121. In this first quadrant, the H-bridge circuit 20X of the X phase is operated in the charge mode. At this time, the high-side switching element 6 of the leg on the connection point Mout0 of the H-bridge circuit 20X and the connection point Mout0 conduct current to the DC power source 140 to apply the power voltage MVdd, and the connection point Mout1 conducts current to the ground 142 to become 0 [V]. The coil current IMX of the X phase flows in a direction from the connection point Mout0 to the connection point Mout1 and an absolute value of the current is gradually increased.

In the first quadrant, all the switching elements of the H-bridge circuit 20Y of the Y phase are set to off-state, and the H-bridge circuit is operated in the high-dissipation mode from time t111 to time t112 and is operated in the free mode after time t112. In FIG. 9, the high-dissipation mode is simply designated as "K."

Immediately after time t111, the voltage VMout2 of the connection point Mout2 of the Y phase becomes equal to or more than (+MVdd+Vf) [V] by the flyback pulse and is clamped by the diode. Further, the voltage VMout3 of the connection point Mout3 becomes equal to or less than (−Vf) [V] and is clamped by the diode. The voltage values of the voltage VMout2 of the connection point Mout2 and the voltage VMout3 of the connection point Mout3 are continued for a predetermined period. In time t121, the voltage VMout2 is suddenly reduced to become 0 [V]. Later than the voltage VMout2, the voltage VMout3 is slightly increased and then gently reduced to become 0 [V] again in time t21. The coil current IMY of the Y phase flows in a direction from the connection point Mout3 to the connection point Mout2 immediately after time t111, but the absolute value of the current is gradually reduced to become 0 [mA] shortly before time t112 and then holds 0 [mA] until reaching time t121.

The second quadrant is a period from time t121 to time t131. In this second quadrant, all the switching elements 2, 4, 6 and 8 of the H-bridge circuit 20X of the X phase are set to off-state, and the H-bridge circuit is operated in the high-dissipation mode from time t121 to time t122 and is operated in the free mode after time t122.

Immediately after time t121, the voltage VMout1 of the connection point Mout1 of the X phase becomes equal to or more than (+MVdd+Vf) [V] by the flyback pulse and is clamped by the diode 12. Further, the voltage VMout0 of the connection point Mout0 becomes equal to or less than (−Vf) [V] and is clamped by the diode 18. The voltage values of the voltage VMout1 of the connection point Mout1 and the voltage VMout0 of the connection point Mout0 are continued for a predetermined period. In time t122, the voltage VMout1 is suddenly reduced to become 0 [V]. Later than the voltage VMout1, the voltage VMout0 is slightly increased and then gently reduced to become 0 [V] again in time t131. The coil current IMX of the X phase flows in a direction from the connection point Mout0 to the connection point Mout1 immediately after time t121, but the absolute value of the current is gradually reduced to become 0 [mA] shortly before time t122 and then holds 0 [mA] until reaching time t131.

In the second quadrant, the H-bridge circuit 20Y of the Y phase is operated in the charge mode. At this time, the high-side switching element of the leg on the connection point Mout2 of the H-bridge circuit 20Y and the low-side switching element of the leg on the connection point Mout3 thereof are set to on-state. Thus, the connection point Mout2 conducts current to the DC power source 140 to apply the power voltage MVdd, and the connection point Mout3 conducts current to the ground 142 to become 0 [V]. The coil current IMY of the Y phase flows in a direction from the connection point Mout2 to the connection point Mout3 and an absolute value of the current is gradually increased.

The third quadrant is a period from time t131 to time t141. In this third quadrant, the H-bridge circuit 20X of the X phase is operated in the charge mode. At this time, the high-side switching element 2 of the leg on the connection point Mout1 of the H-bridge circuit 20X and the low-side switching element 8 of the leg on the connection point Mout0 thereof are set to on-state. Thus, the connection point Mout1 conducts current to the DC power source 140 to apply the power voltage MVdd, and the connection point Mout0 conducts current to the ground 142 so that the applied voltage becomes 0 [V]. The coil current IMX of the X phase flows in a direction from the connection point Mout1 to the connection point Mout0 and simultaneously an absolute value of the current is gradually increased.

In this third quadrant, all the switching elements of the H-bridge circuit 20Y of the Y phase are set to off-state, and the H-bridge circuit is operated in the high-dissipation mode from time t131 to time t132 and is operated in the free mode after time t132.

Immediately after time t131, the voltage VMout3 of the connection point Mout3 of the Y phase becomes equal to or more than (+MVdd+Vf) [V] by the flyback pulse and is clamped by the diode. Further, the voltage VMout2 of the connection point Mout2 becomes equal to or less than (-Vf) [V] and is clamped by the diode. The voltage values of the voltage VMout3 of the connection point Mout3 and the voltage VMout2 of the connection point Mout2 are continued for a predetermined period. In time t132, the voltage VMout3 is suddenly reduced to become 0 [V]. Later than the voltage VMout3, the voltage VMout2 is slightly increased and then gently reduced to become 0 [V] again in time t141. The coil current IMY of the Y phase flows in a direction from the connection point Mout2 to the connection point Mout3 immediately after time t131, but the absolute value of the current is gradually reduced to become 0 [mA] shortly before time t132 and then holds 0 [mA] until reaching time t141.

The fourth quadrant is a period from time t141 to time t151. In this fourth quadrant, all the switching elements 2, 4, 6 and 8 of the H-bridge circuit 20X of the X phase are set to off-state, and the H-bridge circuit is operated in the high-dissipation mode from time t141 to time t142 and is operated in the free mode after time t142.

Immediately after time t141, the voltage VMout0 of the connection point Mout0 of the X phase becomes equal to or more than (+MVdd+Vf) [V] by the flyback pulse and is clamped by the diode 16. Further, the voltage VMout1 of the connection point Mout1 becomes equal to or less than (-Vf) [V] and is clamped by the diode 14. The voltage values of the voltage VMout0 of the connection point Mout0 and the voltage VMout1 of the connection point Mout1 are continued for a predetermined period. In time t142, the voltage VMout0 is suddenly reduced to become 0 [V].

Later than the voltage VMout0, the voltage VMout1 is slightly increased and then gently reduced to become 0 [V] again in time t151. The coil current IMX of the X phase flows in a direction from the connection point Mout1 to the connection point Mout0 immediately after time t141, but the absolute value of the current is gradually reduced to become 0 [mA] shortly before time t142 and then holds 0 [mA] until reaching time t151.

In the fourth quadrant, the H-bridge circuit 20Y of the Y phase is operated in the charge mode. At this time, the high-side switching element of the leg on the connection point Mout3 of the H-bridge circuit 20Y and the low-side switching element of the leg on the connection point Mout2 thereof are set to on-state. Thus, the connection point Mout3 conducts current to the DC power source 140 to apply the power voltage MVdd, and the connection point Mout2 conducts current to the ground 142 to become 0 [V]. The coil current IMY of the Y phase flows in a direction from the connection point Mout3 to the connection point Mout2 and an absolute value of the current is gradually increased.

The motor 120 rotates while repeating waveforms from the first quadrant to the fourth quadrant.

A power dissipation $P_{on}$ of the current applying period may be calculated from the following Equation (1).

$$P_{on} = I_{rms}^2 \times (R_{dsH} + R_{dsL}) \quad (1)$$

wherein:
$P_{on}$ is a power dissipation during the current applying period;
$I_{rms}$ is an effective value of a coil current;
$R_{dsH}$ is a resistance between drain and source of the high-side switching element when the high-side switching element is turned on; and
$R_{dsL}$ is a resistance between drain and source of the low-side switching element when the low-side switching element is turned on.

A power dissipation $P_{off1}$ of the high-dissipation period may be calculated from the following Equation (2), if no current returns to the DC power source 140 and all the current leaks to the ground 142 due to parasitic transistor effect.

$$P_{off1} = \left( \left( \frac{I_{peak}}{2} \times V_f \right) + \left( \frac{I_{peak}}{2} \times (MV_{dd} + V_f) \right) \right) \times D_{fly} \quad (2)$$

wherein:
$P_{off1}$ an is a power dissipation during the high-dissipation period;
$I_{peak}$ is the maximum coil current;
$V_f$ is a voltage drop in forward direction of the diode; and
$D_{fly}$ is a ratio of high-dissipation period for each quadrant.
In the free period, since current rarely flows in the coil 124, there is no power dissipation. In one electrical angle of the two-phase step motor, the power dissipation P may be calculated from the following Equation (3).

$$P = (P_{on} + P_{off1}) \times 4 \quad (3)$$

wherein:
P is a power dissipation for each electrical angle of the stepping motor.

As expressed in Equation (1) to (3), the power dissipation P is greatly affected by the power voltage MVdd, the coil current, and the ratio of high-dissipation period. Therefore, a large power dissipation occurs under the parasitic transistor effect.

Figure 10:
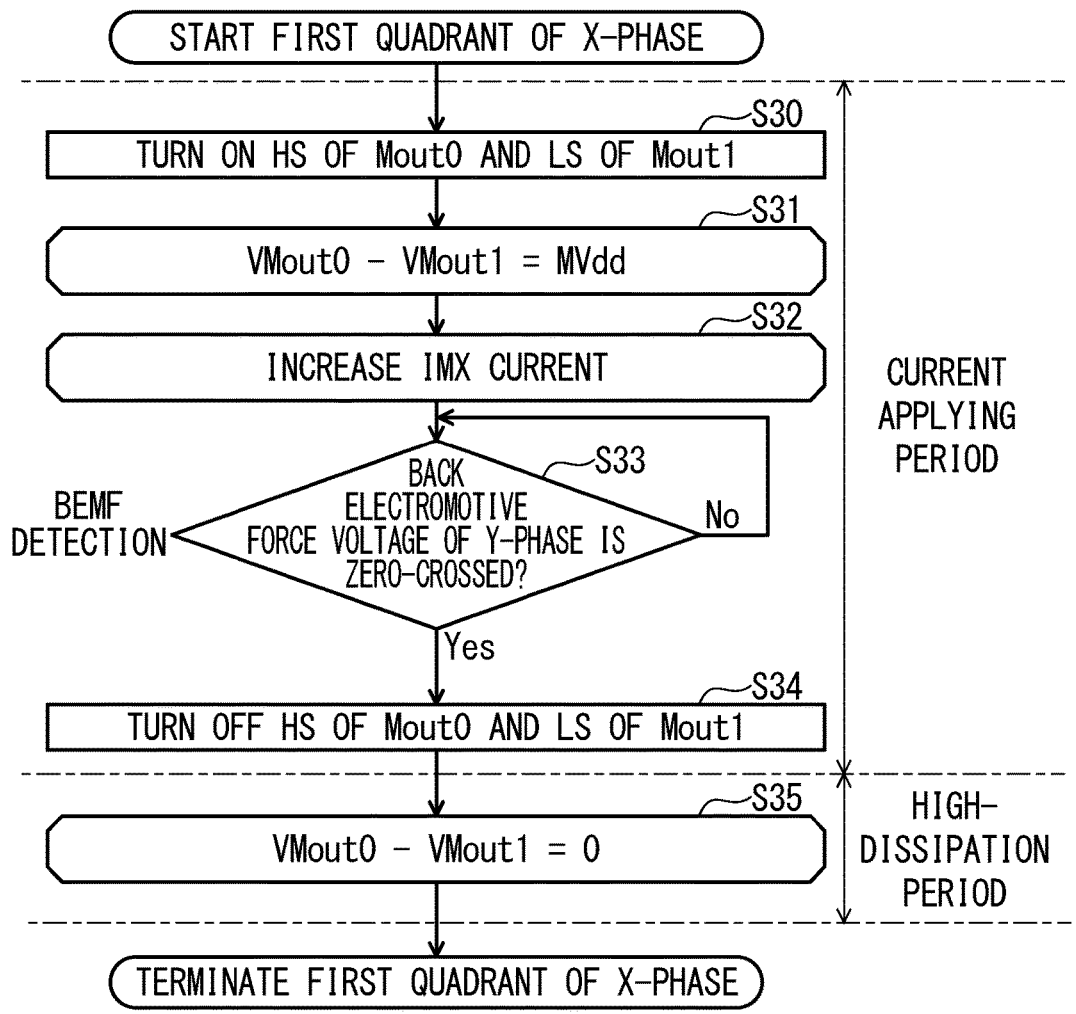
FIG. 10 is a flowchart illustrating the processing of a first quadrant of the X phase of a motor controller according to the comparative example.

FIG. 10 is a flowchart illustrating the processing of a first quadrant of the X phase of an apparatus for controlling a drive of a motor according to the comparative example. Further, octagons shown in the flowchart illustrate the state of the H-bridge circuits 20X and 20Y.

The X phase starts the first quadrant from the current applying period. A bridge control circuit 110 turns on the high-side switching element 6 of the leg on the connection point Mout0 and the low-side switching element 4 of the leg on the connection point Mout1, in the H-bridge circuit 20X of the X phase (step S30). Thus, the H-bridge circuit 20X of the X phase performs current application in the first quadrant. At this time, a difference between the voltage VMout0 and the voltage VMout1 becomes the power voltage MVdd (step S31). Current flows from the connection point Mout0 to the connection point Mout1, so that the motor 120 is rotated and the absolute value of the coil current IMX is gradually increased (step S32).

Here, if the back electromotive force voltage of the Y-phase voltage VMY is zero-crossed (Yes in step S33), the high-side switching element 6 of the leg on the connection point Mout0 of the X phase and the low-side switching element 4 of the leg on the connection point Mout1 thereof are turned off (step S34), the X phase is shifted to the high-dissipation period. Thereby, the voltage VMout0 becomes equal to the voltage VMout1 (step S35), so that the first quadrant is terminated.

In the first quadrant, the H-bridge circuit 20Y of the Y phase takes a voltage waveform where the flyback voltage and the back electromotive force voltage are cancelled from each other. In an initial stage of the first quadrant, the back electromotive force voltage is generated by the rotation of the motor. However, simultaneously, because all the switching elements are turned off in a last stage of a preceding fourth quadrant, the flyback voltage is induced by the coil 124Y in a direction opposite to that of the preceding current application and then a shift to the high-dissipation period is performed. By this flyback voltage, the voltage VMout2 becomes equal to or more than the sum of the power voltage MVdd and a voltage drop Vf in the diode's forward direction and is clamped by the diode. Further, the voltage VMout3 becomes equal to or less than the voltage drop Vf in the diode's forward direction and is clamped by the diode. The voltage values of the voltage VMout2 and voltage VMout3 are continued for a predetermined period.

Thus, a current path is formed to cause current to flow from the ground 142 through the coil 124Y back to the DC power source 140, so that the absolute value of the coil current IMY is decreased at high speed until it becomes 0 [mA] and the flyback voltage is cancelled. The H-bridge circuit 20Y of the Y phase is shifted to the free period by cancelling the flyback voltage. Therefore, the back electromotive force voltage appears between the connection point Mout2 and the connection point Mout3, by the rotation of the motor. When the back electromotive force voltage of the voltage VMY of the Y phase is zero-crossed, the step S32 is performed and the first quadrant is terminated.

Figure 11:
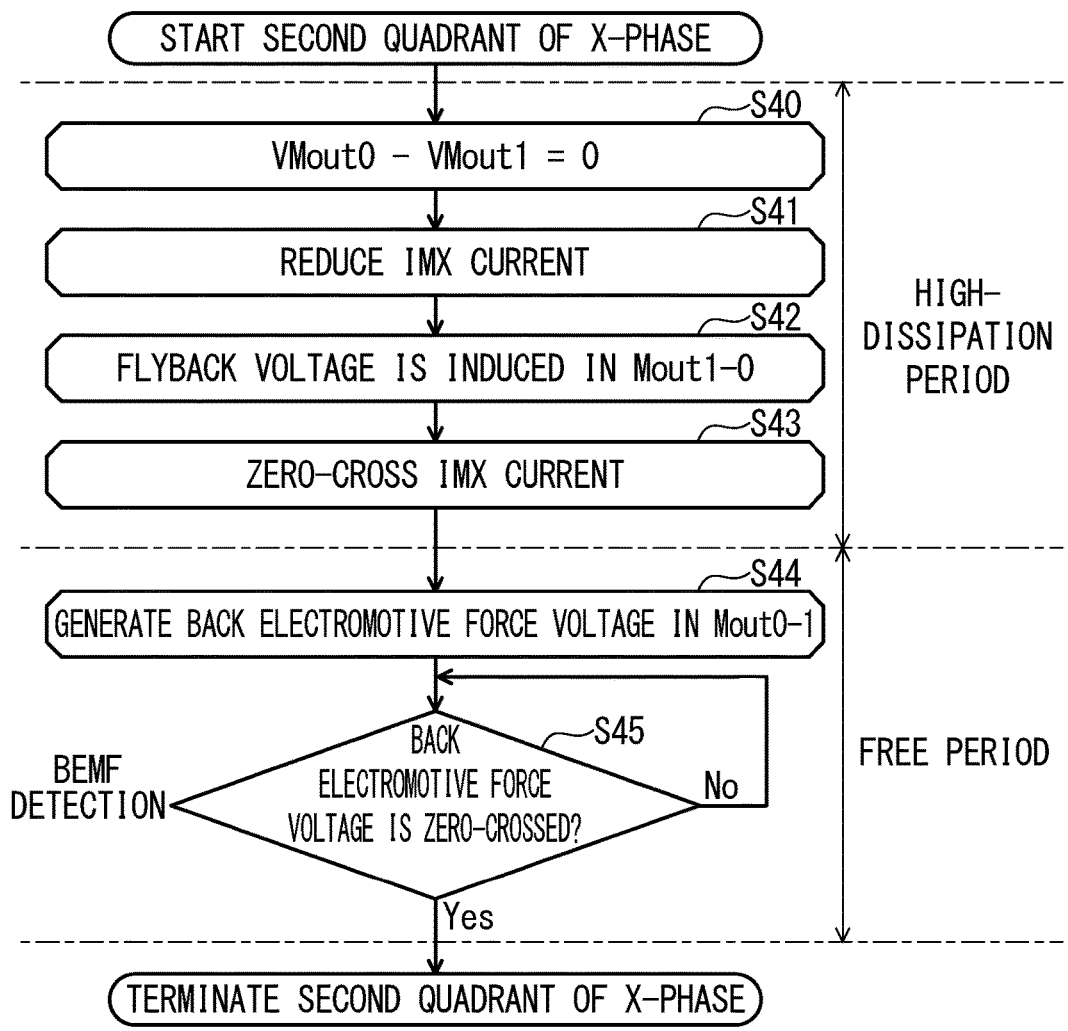
FIG. 11 is a flowchart illustrating the processing of a second quadrant of the X phase of the apparatus for controlling the drive of the motor according to the comparative example.

FIG. 11 is a flowchart illustrating the processing of a second quadrant of the X phase of the apparatus for controlling the drive of the motor according to the comparative example.

In the second quadrant, the H-bridge circuit 20X of the X phase takes a voltage waveform where the flyback voltage and the back electromotive force voltage are cancelled from each other. In an initial stage of the second quadrant, the back electromotive force voltage is generated by the rotation of the motor. However, simultaneously, because all the switching elements are turned off in the last stage of the preceding first quadrant, the flyback voltage is induced by the coil 124Y in a direction opposite to that of the preceding current application and then a shift to the high-dissipation period is performed.

In the initial stage of the second quadrant, the H-bridge circuit 20X of the X phase has the voltage VMout0 and the voltage VMout1 which are equal to each other (step S40). Subsequently, energy stored in the coil 124X is released and the coil current IMX is reduced (step S41), so that the flyback voltage is induced between the connection point Mout1 and the connection point Mout0 (step S41).

By the flyback voltage of the X phase, the voltage VMout0 becomes equal to or more than the sum of the power voltage MVdd and the voltage drop Vf in the forward direction of the diode 12 and is clamped by the diode 16. Further, the voltage VMout1 becomes equal to or less than the voltage drop Vf in the forward direction of the diode 18 and is clamped by the diode 14. The voltage values of the voltage VMout0 and the voltage VMout1 are continued for a predetermined period. Thus, a current path is formed to cause current to flow from the ground 142 through the diode 18, the coil 124X and the diode 12 back to the DC power source 140, so that the absolute value of the coil current IMX is decreased at high speed until it becomes 0 [mA] (step S43) and a shift to the free period is performed.

In the free period, the back electromotive force voltage appears between the connection point Mout1 and the connection point Mout0, by the rotation of the motor (step S44). The back electromotive force voltage of the voltage VMX of the X phase is zero-crossed (step S45>Yes), so that the second quadrant is terminated.

In the second quadrant, the H-bridge circuit 20Y of the Y phase performs an operation corresponding to the X-phase operation mode of FIG. 10. That is, the H-bridge circuit 20Y of the Y phase turns on the high-side switching element of the leg on the connection point Mout2 and the low-side switching element of the leg on the connection point Mout3 (corresponding to step S30 of FIG. 10) and applies current. A difference between the voltage VMout2 and the voltage VMout3 becomes the voltage MVdd (corresponding to step S31 of FIG. 10). At this time, current flows from the connection point Mout2 to the connection point Mout3, so that the motor 120 rotates and the absolute value of the coil current IMY gradually increases (corresponding to step S32 of FIG. 10).

Here, if the back electromotive force voltage of the X-phase voltage VMX is zero-crossed (corresponding to step S33 of FIG. 10>Yes), the high-side switching element of the leg on the connection point Mout2 of the Y phase and the low-side switching element of the leg on the connection point Mout3 thereof are turned off (corresponding to step S34 of FIG. 10), and the Y phase is shifted to the high-dissipation period. Thereby, the voltage VMout2 becomes equal to the voltage VMout3 (corresponding to step S35 of FIG. 10), so that the second quadrant is terminated.

FIGS. 3A to 3D are explanatory views illustrating an operating mode of the H-bridge circuit 20 according to the embodiment.

Figure 3A:
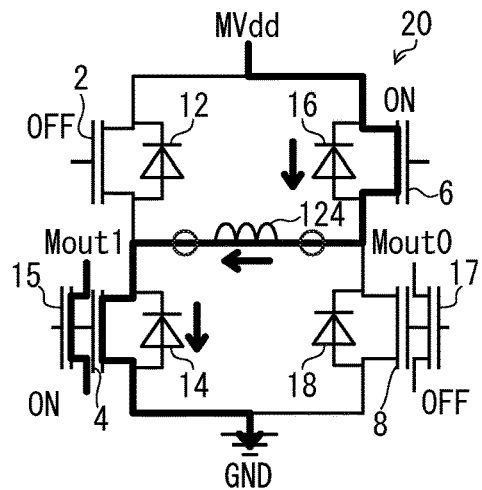
FIGS. 3A-3E are explanatory views illustrating operation modes of an H-bridge circuit according to the embodiment.

FIG. 3A is a view illustrating an operation of the H-bridge circuit 20 in the charge mode, which is the same as that of the H-bridge circuit 20 of FIG. 8A. The H-bridge circuit 20 is shifted to the high-dissipation mode of FIG. 3B in the same manner as the comparative example, after the charge mode.

Figure 3B:
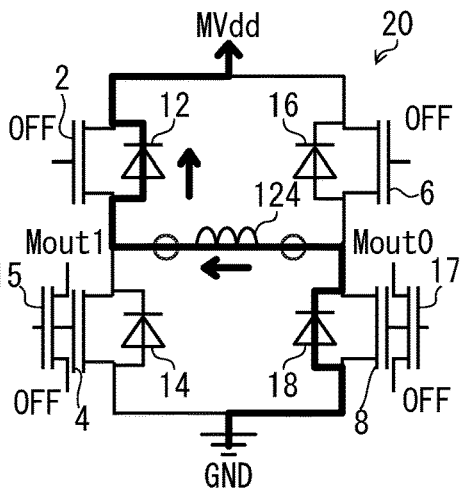

FIG. 3B is a view illustrating an operation of the H-bridge circuit 20 in the high-dissipation mode, which is the same as that of the high-dissipation mode of the H-bridge circuit 20 of FIG. 8B. The H-bridge circuit 20 of the comparative example holds the high-dissipation mode during the generation of the flyback voltage. However, the H-bridge circuit 20 of the embodiment is configured such that, if a predetermined time has passed, the switching element 2 is changed from an off-state to an on-state, and consequently the H-bridge circuit is shifted to a low-dissipation mode of FIG. 3C.

Figure 3C:
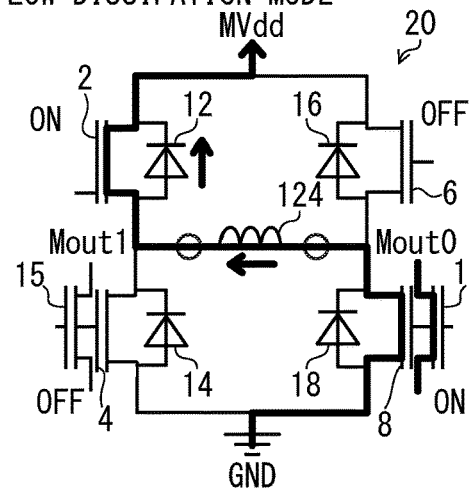

FIG. 3C is a view illustrating an operation of the H-bridge circuit 20 in the low-dissipation mode.

By the energy stored in the coil 124, current flows through the switching element 8, the coil 124, and the switching element 2 in a direction shown by the bold line. That is, the high-side switching element 2 that is located in a motor-current flowing direction shown by the bold line takes the conduction state, and energy accumulated in the coil 124 causes current to flow in a closed circuit formed by the high-side switching element 2 that is in the conduction state and is in the conduction state and the low-side switching element 8 that is located in a direction opposite to the motor-current flowing direction shown by the bold line. In the low-dissipation mode of FIG. 3C, the power dissipation occurs only by the on-resistance of the switching elements 8 and 2, and is lower than that in the high-dissipation mode.

Even if the H-bridge circuit 20 of the embodiment is configured by the CMOS manufacturing process, there is no case where the current leaks to the ground 142 to generate heat by the parasitic transistor effect, so that it is possible to further prevent the dissipation of energy. The period when the H-bridge circuit 20 is operated in the low dissipation mode is referred to as a "flyback period."

Figure 3D:
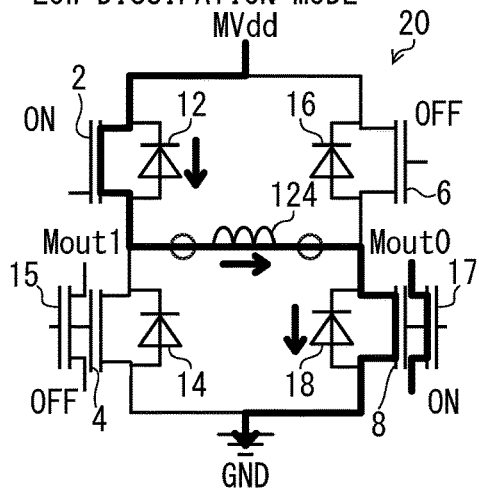

If the coil 124 sufficiently releases energy from the state of FIG. 3C, the direction of the current is reversed and thereby the shift to the state of FIG. 3D is performed.

FIG. 3D is a view illustrating an operation of the H-bridge circuit 20 in the low-dissipation mode.

Figure 3E:
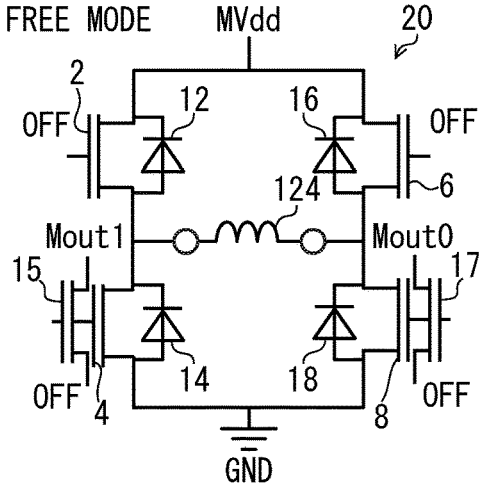

Here, the current flows through the switching element 2, the coil 124, and the switching element 8 in the direction shown by the bold line. If a mirror current for the above-mentioned current flows in the switching element 17 and a minimum current threshold cross that is preset by the D/A converter 115 is detected by the comparator 114, a shift to the state of FIG. 3E is performed. Further, the comparator 114 is used to measure the positive current of the coil 124, for the purpose of controlling and detecting the current.

FIG. 3E is a view illustrating an operation of the H-bridge circuit 20 in the free mode, which is the same as that of the H-bridge circuit 20 shown in FIG. 8C. The bridge control circuit 110 is shifted to a next quadrant by detecting the zero-cross of the back electromotive force voltage of the motor 120 in the free period. Further, the H-bridge circuit 20 is shifted to the charge mode of FIG. 3A again.

Figure 4:
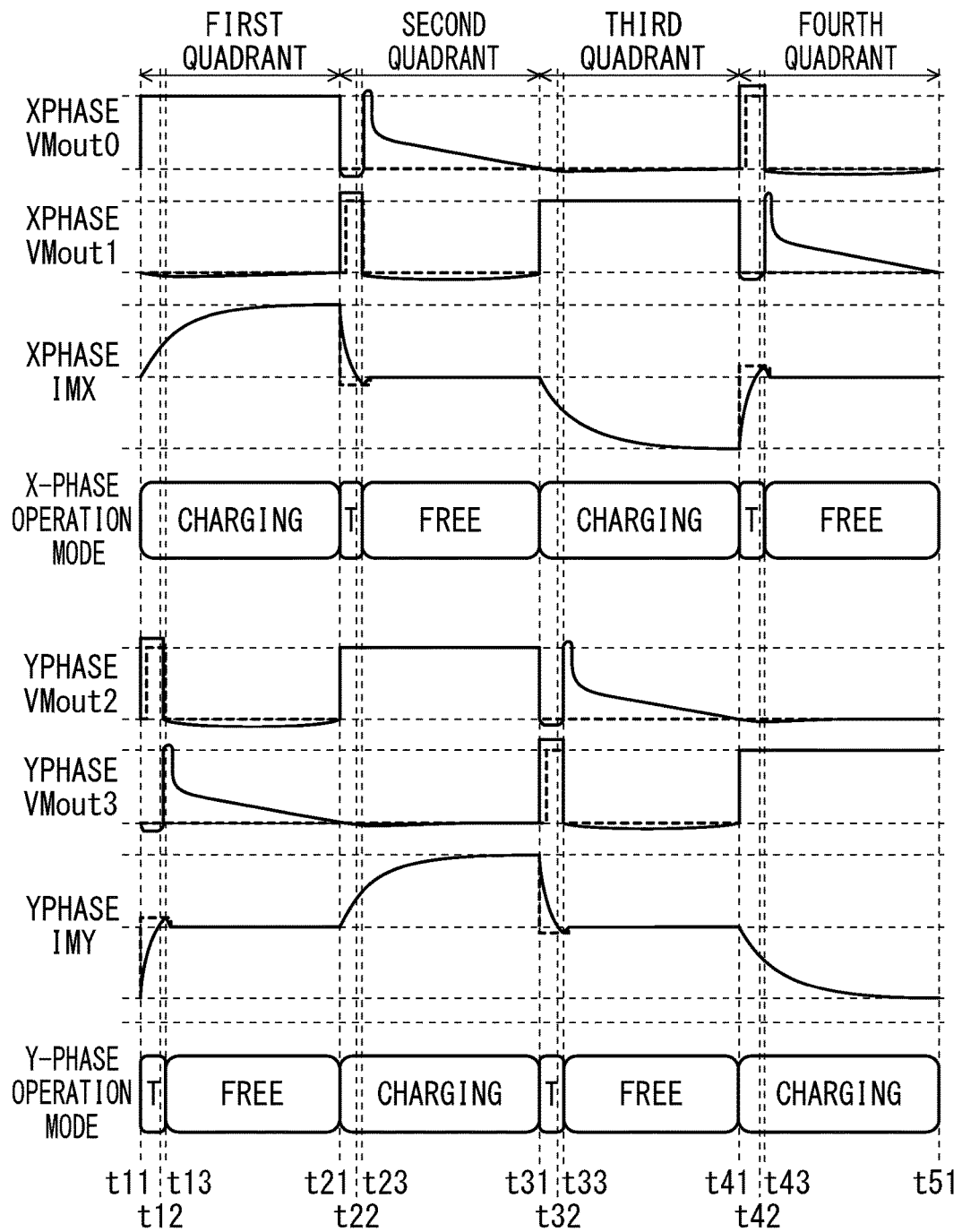
FIG. 4 is a waveform chart illustrating current sequences of an X phase and a Y phase of the H-bridge circuit.

FIG. 4 is a waveform chart illustrating current sequences of the X phase and the Y phase of the H-bridge circuit 20.

Similarly to FIG. 9, the waveform chart of FIG. 4 shows the voltage VMout0 of the X phase in a solid line and the setting of the switching element 6 in a broken line. The voltage VMout1 of the X phase is shown in the bold line and the setting of the switching element 2 is shown in a bold broken line. This bold broken line is described in an H level when each switching element is turned on and in an L level when each switching element is turned off. Further, the coil current IMX and the operating mode of the X phase are also shown in FIG. 9.

The waveform chart of FIG. 4 shows the voltage VMout2 of the Y phase in a bold line and the setting of the high-side switching element of a leg on the connection point Mout2 in a bold broken line. The voltage VMout3 of the Y phase is shown in a bold line and the setting of the high-side switching element of a leg on the connection point Mout3 is shown in a bold broken line. Further, the coil current IMY and the operating mode of the Y phase are also shown in FIG. 4.

The motor controller 100 of the embodiment drives the motor 120 in one phase excitation in response to motor drive voltage and load, as in the comparative example. The motor 120 rotates by constituting one electrical angle with four phases (quadrants). If the X phase is the current applying period (see FIG. 3A) in any quadrant, the Y phase passes through the high-dissipation period (see FIG. 3B) to become the flyback period (see FIGS. 3C and 3D) and then takes the free period (see FIG. 3E).

When the motor drive voltage is high or the load is small, the rotating speed of the motor 120 is increased, the maximum current of the coil 124 is reduced. If the motor drive load is small, a flyback pulse time is shortened. The back electromotive force voltage is generated in the free period of each phase. This back electromotive force voltage is high if the motor rotating speed is fast, and becomes 0 [V] at the time of being stopped, so that it may be used to detect the stall of synchronism.

In FIG. 4, the first quadrant is a period from time t11 to time t21. In this first quadrant, the H-bridge circuit 20X of the X phase is operated in the charge mode. At this time, the high-side switching element 6 of the leg on the connection point Mout0 of the H-bridge circuit 20X and the low-side switching element 4 of the leg on the connection point Mout1 thereof are set to on-state. Thus, the connection point Mout0 conducts current to the DC power source 140 to apply the power voltage MVdd, and the connection point Mout1 conducts current to the ground 142 to become 0 [V]. The coil current IMX of the X phase flows in a direction from the connection point Mout0 to the connection point Mout1 and an absolute value of the current is gradually increased.

In the initial stage of the first quadrant, all the switching elements of the H-bridge circuit 20Y of the Y phase are set to off-state, and the H-bridge circuit is operated in the high-dissipation mode for a short period (predetermined period) of time after time t11. At this time, the voltage VMout2 of the Y phase becomes equal to or more than (+MVdd+Vf) [V] by the flyback pulse and is clamped by the diode. Further, the voltage VMout3 becomes equal to or less than (−Vf) [V] and is clamped by the diode. The voltage values of the voltage VMout2 and the voltage VMout3 are continued for a predetermined period. The coil current IMY of the Y phase flows in a direction from the connection point Mout3 to the connection point Mout2. Further, the description of the high-dissipation mode is omitted in FIG. 4.

After a predetermined period has passed from time t11, the high-side switching element of the leg on the connection point Mout2 of the H-bridge circuit 20Y and the low-side switching element of the leg on the connection point Mout3 are set to on-state, and an operation is performed in the low-dissipation mode until time t13. Further, the low-dissipation mode is simply designated as "T" in FIG. 4.

At this time, the voltage VMout2 of the Y phase becomes equal to (+MVdd) [V], and the voltage VMout3 becomes equal to 0 [V]. The coil current IMY of the Y phase flows in a direction from the connection point Mout3 to the connection point Mout2 and the absolute value is gradually reduced, so that the zero-cross and the reversing operation are performed in time t12. In time t13, the coil current IMY crosses the minimum current threshold.

In the low-dissipation mode, the bridge control circuit 110 presets the minimum current threshold with the D/A converter 115, and periodically detects that the coil current IMY crosses the minimum current threshold by the comparator 114. If the coil current IMY crosses the minimum current threshold, the bridge control circuit 110 turns off the high-side switching element of the leg on the connection point Mout2 and the low-side switching element of the leg on the connection point Mout3. This is performed in time t13. Such a control method allows power dissipation to be optimally prevented depending on the operational conditions, such as the power voltage MVdd or load supplied to the motor 120.

If the turning off of the switching element is delayed when the flyback period is terminated, voltages on opposite sides of the coil are equilibrated by the power voltage MVdd supplied to the motor 120, so that the voltage waveform may be dispersed. The coil current IMY is decreased to a large extend as compared to a peak of the flyback pulse, but the power voltage MVdd supplied to the motor 120 is applied in a direction opposite to the motor driving direction to serve as a brake against the rotation of the motor. This may be realized by setting the minimum current threshold of the D/A converter 115 that may be detected by the comparator 114 and shortening the sampling cycle of the comparator 114.

In time t13, all the switching elements are set to off-state and then the operation is performed in the free mode. At this time, the voltage VMout2 is suddenly reduced to become 0 [V], and the voltage VMout3 is suddenly increased and then reduced by a ramp to become 0 [V] again in time t21. The coil current IMY becomes 0 [mA].

The second quadrant is a period from time t21 to time t31. In the initial stage of the second quadrant, all the switching elements 2, 4, 6 and 8 of the H-bridge circuit 20X of the X phase are set to off-state, and the H-bridge circuit is operated in the high-dissipation mode in a short period (predetermined period) after time t21. At this time, the voltage VMout1 of the X phase becomes equal to or more than (+MVdd+Vf) [V] by the flyback pulse and is clamped by the diode 12. Further, the voltage VMout0 becomes equal to or less than (−Vf) [V] and is clamped by the diode 18. The voltage values of the voltage VMout1 and the voltage VMout0 are continued for a predetermined period. The coil current IMX of the X phase flows in a direction from the connection point Mout0 to the connection point Mout1, but the absolute value of the current is gradually reduced so that the zero-cross and the reversing operation are performed in time t22. In time t23, the absolute value of the coil current IMX crosses the minimum current threshold.

In the low-dissipation mode, the bridge control circuit 110 presets the minimum current threshold with the D/A converter 115, and periodically detects that the coil current IMX crosses the minimum current threshold by the comparator 114. If the coil current IMX crosses the minimum current threshold, the bridge control circuit 110 turns off the high-side switching element 2 of the leg on the connection point Mout1 and the low-side switching element 8 of the leg on the connection point Mout0. This is performed in time t23.

In time t23, all the switching elements 2, 4, 6 and 8 are set to off-state and then the operation is performed in the free mode. At this time, the voltage VMout1 is suddenly reduced to become 0 [V], and the voltage VMout0 is suddenly increased and then reduced by a ramp to become 0 [V] again in time t31. The coil current IMX becomes 0 [mA].

In the second quadrant, the H-bridge circuit 20Y of the Y phase is operated in the charge mode. At this time, the high-side switching element of the leg on the connection point Mout2 of the H-bridge circuit 20Y and the low-side switching element of the leg on the connection point Mout3 thereof are set to on-state. Thus, the connection point Mout2 conducts current to the DC power source 140 to apply the power voltage MVdd, and the connection point Mout3 conducts current to the ground 142 to become 0 [V]. The coil current IMY of the Y phase flows in a direction from the connection point Mout2 to the connection point Mout3 and an absolute value of the current is gradually increased.

The third quadrant is a period from time t31 to time t41. In this third quadrant, the H-bridge circuit 20X of the X phase is operated in the charge mode. At this time, the high-side switching element 2 of the leg on the connection point Mout1 of the H-bridge circuit 20X and the low-side switching element 8 of the leg on the connection point Mout0 thereof are set to on-state. Thus, the connection point Mout1 conducts current to the DC power source 140 to apply the power voltage MVdd, and the connection point Mout0 conducts current to the ground 142 so that the applied voltage becomes 0 [V]. The coil current IMX of the X phase flows in a direction from the connection point Mout1 to the connection point Mout0 and an absolute value of the current is gradually increased.

In the initial stage of the third quadrant, all the switching elements of the H-bridge circuit 20Y of the Y phase are set to off-state, and the H-bridge circuit is operated in the high-dissipation mode for a short period (predetermined period) after time t31. At this time, the voltage VMout3 of the Y phase becomes equal to or more than (+MVdd+Vf) [V] by the flyback pulse and is clamped by the diode. Further, the voltage VMout2 becomes equal to or less than (−Vf) [V] and is clamped by the diode. The voltage values of the voltage VMout3 and the voltage VMout2 are continued for a predetermined period. The coil current IMY of the Y phase flows in a direction from the connection point Mout2 to the connection point Mout3.

After a predetermined period has passed from time t31, the high-side switching element of the leg on the connection point Mout3 of the H-bridge circuit 20Y and the low-side switching element of the leg on the connection point Mout2 are set to on-state, and an operation is performed in the low-dissipation mode until time t33.

At this time, the voltage VMout3 of the Y phase becomes equal to (+MVdd) [V], and the voltage VMout2 becomes equal to (0) [V]. The coil current IMY of the Y phase flows in a direction from the connection point Mout2 to the connection point Mout3 and the absolute value is gradually reduced, so that the zero-cross and the reversing operation are performed in time t32. In time t33, the coil current IMY crosses the minimum current threshold.

In the low-dissipation mode, the bridge control circuit 110 presets the minimum current threshold with the D/A converter 115, and periodically detects that the coil current IMY crosses the minimum current threshold by the comparator 114. If the coil current IMY crosses the minimum current threshold, the bridge control circuit 110 turns off the high-side switching element of the leg on the connection point Mout3 and the low-side switching element of the leg on the connection point Mout2. This is performed in time t33.

In time t33, all the switching elements are set to off-state and then the operation is performed in the free mode. At this time, the voltage VMout3 is suddenly reduced to become 0 [V], and the voltage VMout2 is suddenly increased and then reduced by a ramp to become 0 [V] again in time t41. The coil current IMY becomes 0 [mA].

The fourth quadrant is a period from time t41 to time t51. In the initial stage of this fourth quadrant, all the switching elements 2, 4, 6 and 8 of the H-bridge circuit 20X of the X phase are set to off-state, and the H-bridge circuit is operated in the high-dissipation mode for a short period (predetermined period) after time t41. At this time, the voltage VMout0 of the X phase becomes equal to or more than (+MVdd+Vf) [V] by the flyback pulse and is clamped by the diode 16. Further, the voltage VMout1 becomes equal to or less than (−Vf) [V] and is clamped by the diode 14. The voltage values of the voltage VMout0 and the voltage VMout1 are continued for a predetermined period. The coil current IMX of the X phase flows in a direction from the connection point Mout1 to the connection point Mout0, and the absolute value is gradually reduced, so that the zero-cross and the reversing operation are performed in time t42. In time t43, the absolute value of the coil current IMX crosses the minimum current threshold.

In the low-dissipation mode, the bridge control circuit 110 presets the minimum current threshold with the D/A converter 115, and periodically detects that the coil current IMX crosses the minimum current threshold by the comparator 114. If the coil current IMX crosses the minimum current threshold, the bridge control circuit 110 turns off the high-side switching element 6 of the leg on the connection point Mout0 and the low-side switching element 4 of the leg on the connection point Mout1. This is performed in time t43.

In time t43, all the switching elements are set to off-state and then the operation is performed in the free mode. At this time, the voltage VMout0 is suddenly reduced to become 0 [V], and the voltage VMout1 is suddenly increased and then reduced by a ramp to become 0 [V] again in time t51. The coil current IMX becomes 0 [mA].

In the fourth quadrant, the H-bridge circuit 20Y of the Y phase is operated in the charge mode. At this time, the high-side switching element of the leg on the connection point Mout3 of the H-bridge circuit 20Y and the low-side switching element of the leg on the connection point Mout2 thereof are set to on-state. Thus, the connection point Mout3 conducts current to the DC power source 140 to apply the power voltage MVdd, and the connection point Mout2 conducts current to the ground 142 to become 0 [V]. The coil current IMY of the Y phase flows in a direction from the connection point Mout3 to the connection point Mout2 and an absolute value of the current is gradually increased.

The motor 120 rotates while repeating waveforms from the first quadrant to the fourth quadrant.

In the embodiment, for example, if the X phase is the current applying period, the Y phase is shifted to the high-dissipation period, the flyback period and the free period. The power dissipation is reduced by the shift to the flyback period.

It is assumed that, in the high-dissipation mode of the embodiment, current does not return to the DC power source 140 but all current leaks to the ground 142 by the parasitic transistor effect. In this case, the power dissipation $P_{off2}$ is represented by the following Equation (4).

$$P_{off2} = \left[\left(\frac{I_{peak}}{2} \times V_f\right) + \left(\frac{I_{peak}}{2} \times (MV_{dd} + V_f)\right)\right] \times D_{dead} \quad (4)$$

wherein:

$P_{off2}$ is a power dissipation during the high-dissipation period;

$I_{peak}$ is the maximum coil current;

$V_f$ is a voltage drop in forward direction of the diode; and $D_{dead}$ is a time ratio of high-dissipation period for each quadrant.

Since passing through the switching element, the power dissipation $P_{off3}$ of the flyback period is represented by the following Equation (5).

$$P_{off3} = (I_{peak}^2 \times R_{dsL} + I_{peak}^2 \times R_{dsH}) \times D_{fly} \quad (5)$$

wherein:

$P_{off3}$ is a power dissipation during the flyback period;

$I_{peak}$ is the maximum coil current;

$V_f$ is a voltage drop in forward direction of the diode;

$R_{dsL}$ is a resistance between drain and source of the low-side switching element when the low-side switching element is turned on;

$R_{dsH}$ is a resistance between drain and source of the high-side switching element when the high-side switching element is turned on; and $D_{fly}$ is a ratio of high-dissipation period for each quadrant.

The power dissipation P of one electrical angle of the two-phase stepping motor is represented by the following Equation (6).

$$P = (P_{on} + P_{off2} + P_{off3}) \times 4 \quad (6)$$

wherein:

P is a power dissipation for each electrical angle of the stepping motor.

As expressed in Equation (5), since passing through the switching element in the "flyback period," the power dissipation is not affected by the power voltage MVdd and the parasitic transistor effect. Therefore, it is possible to reduce the power dissipation.

Figure 5:
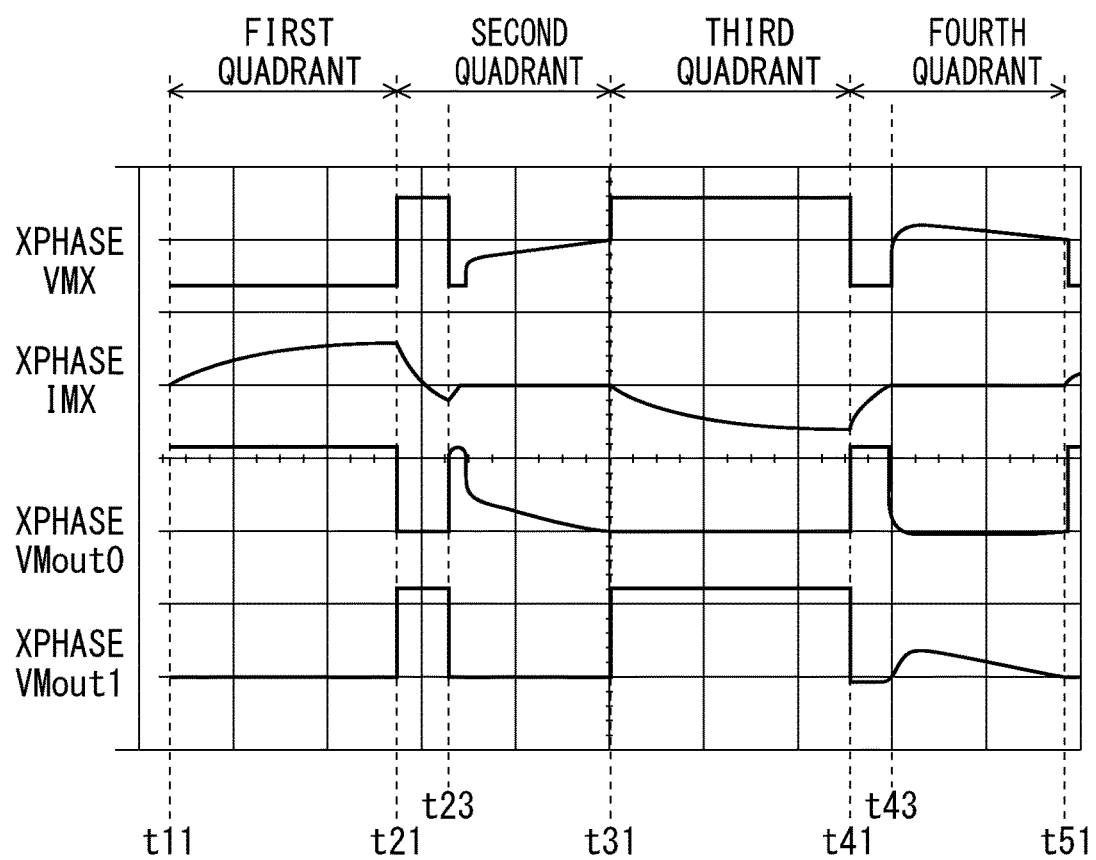
FIG. 5 is a waveform chart illustrating a voltage and a current of each part of the X phase of the H-bridge circuit.

FIG. 5 is a waveform chart illustrating a voltage and a current of each part of the X phase of the H-bridge circuit 20.

The waveform chart of FIG. 5 shows all the X-phase voltage VMX and coil current IMX and the X-phase voltage VMout0 and VMout1 in the waveform of an oscilloscope.

In the first quadrant, the high-side switching element 6 of the leg on the connection point Mout0 of the H-bridge circuit 20X and the low-side switching element 4 of the leg on the connection point Mout1 thereof are set to the on-state.

The voltage VMX of the X phase becomes (−MVdd) [V], and the X-phase coil current IMX flows in the direction from the connection point Mout0 to the connection point Mout1 and the absolute value of the current is gradually increased.

Since the connection point Mout0 conducts current to the DC power source 140, the voltage VMout0 becomes (+MVdd) [V]. Since the connection point Mout1 conducts current to the ground 142, the voltage VMout1 becomes 0 [V].

In the second quadrant, all the switching elements 2, 4, 6 and 8 of the H-bridge circuit 20X are set to the off-state.

The voltage VMX of the X phase becomes equal to or more than (+MVdd+2Vf) [V] by the flyback pulse immediately after time t21, is clamped by the diodes 12 and 18, and then is changed to the low-dissipation mode to become (+MVdd) [V]. This voltage value is continued for a predetermined period. The voltage VMX is suddenly reduced shortly before time t23 to be zero-crossed, and is gently increased after being reduced to a predetermined voltage to be zero-crossed again in time t31. The coil current IMX of the X phase flows in a (positive) direction from the connection point Mout0 to the connection point Mout1 immediately after time t21, but the absolute value of the current is gradually reduced, so that the current (−IMX) becomes larger than the minimum current threshold in time t23 and then becomes 0 [mA] again. Thereafter, the current holds 0 [mA] until time t31.

The voltage VMout0 of the connection point Mout0 becomes equal to or less than (−Vf) [V], by the flyback pulse, immediately after time t21, is clamped by the diode 18, and then is changed to the low-dissipation mode to become 0 [V] until time t23. This voltage is gently increased to a predetermined value and then reduced by the back electromotive force voltage of the motor 120 after time t23, so that it becomes 0 [V] again in time t31.

The voltage VMout1 of the connection point Mout1 becomes equal to or more than (+MVdd+Vf) [V], by the flyback pulse, immediately after time t21, is clamped by the diode 12, and then is changed to the low-dissipation mode to become (+MVdd) [V]. This voltage value is continued for a predetermined period. The voltage VMout1 is suddenly reduced to become 0 [V] in time t23 and then holds 0 [V] until time t31.

In the third quadrant, the high-side switching element 2 of the leg on the connection point Mout1 of the H-bridge circuit 20X and the low-side switching element 8 of the leg on the connection point Mout0 thereof are set to the on-state.

The voltage VMX of the X phase becomes (+MVdd) [V], so that the X-phase coil current IMX flows in the direction from the connection point Mout1 to the connection point Mout0 and the absolute value of the current is gradually increased.

Since the connection point Mout0 conducts current to the ground 142, the voltage VMout0 becomes 0 [V]. Since the connection point Mout1 conducts current to the DC power source 140, the voltage VMout1 becomes (+MVdd) [V].

In the fourth quadrant, all the switching elements 2, 4, 6 and 8 of the H-bridge circuit 20X are set to the off-state.

The voltage VMX of the X phase becomes equal to or less than (−MVdd−2Vf) [V] by the flyback pulse immediately after time t41, is clamped by the diodes 14 and 16, and then is changed to the low-dissipation mode to become (−MVdd) [V]. This voltage value is continued for a predetermined period. The voltage VMX is suddenly increased shortly before time t43 to be zero-crossed, and is gently reduced after being increased to a predetermined voltage to be zero-crossed again in time t51. The coil current IMX of the X phase flows in a (negative) direction from the connection point Mout1 to the connection point Mout0 immediately after time t41, but the absolute value of the current is gradually reduced, so that the current becomes larger than the minimum current threshold in time t43 and then becomes 0 [mA] again. Thereafter, the current holds 0 [mA] until time t51.

The voltage VMout0 of the connection point Mout0 becomes equal to or more than (+MVdd+Vf) [V], by the flyback pulse, immediately after time t41, is clamped by the diode 16, and then is changed to the low-dissipation mode to become (+MVdd) [V]. This voltage value is continued for a predetermined period. The voltage VMout0 is suddenly reduced to become 0 [V] in time t43 and then holds 0 [V] until time t51.

The voltage VMout1 of the connection point Mout1 becomes equal to or more than (−Vf) [V], by the flyback pulse, immediately after time t41, is clamped by the diode 14, and then is changed to the low-dissipation mode to become 0 [V] until time t43. This voltage is gently increased to a predetermined value and then reduced by the back electromotive force voltage of the motor 120 after time t43, so that it becomes 0 [V] again in time t51.

Figure 6:
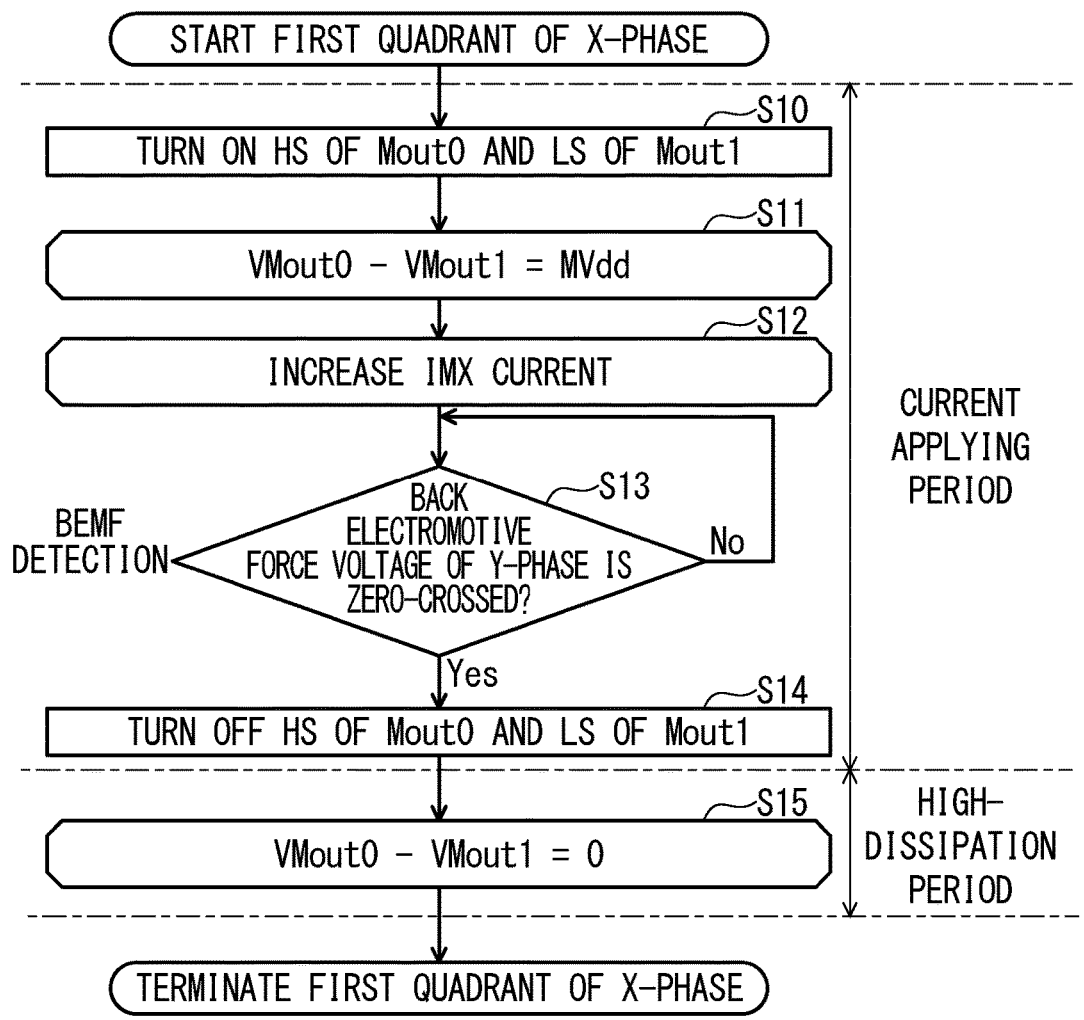
FIG. 6 is a flowchart illustrating the processing of a first quadrant of the X phase of the apparatus for controlling the drive of the motor according to the embodiment.

FIG. 6 is a flowchart illustrating the processing of the first quadrant of the X phase of the apparatus for controlling the drive of the motor according to the embodiment. This is the same as the flowchart of the comparative example in FIG. 10, but is different in Y-phase operation mode.

The X phase starts the first quadrant from the current applying period. The bridge control circuit 110 turns on the high-side switching element 6 of the leg on the connection point Mout0 and the low-side switching element 4 of the leg on the connection point Mout1, in the H-bridge circuit 20X of the X phase (step S10). Thus, the H-bridge circuit 20X of the X phase performs current application in the first quadrant. At this time, a difference between the voltage VMout0 and the voltage VMout1 becomes the power voltage MVdd (step S11). Current flows from the connection point Mout0 to the connection point Mout1, so that the motor 120 is rotated and the absolute value of the coil current IMX is gradually increased (step S12).

Here, if the back electromotive force voltage of the Y-phase voltage VMY is zero-crossed (Yes in step S13), the high-side switching element 6 of the leg on the connection point Mout0 of the X phase and the low-side switching element 4 of the leg on the connection point Mout1 thereof are turned off (step S14), the X phase is shifted to the high-dissipation period. Thereby, the voltage VMout0 becomes equal to the voltage VMout1 (step S15), so that the first quadrant is terminated.

In the first quadrant, the H-bridge circuit 20Y of the Y phase takes a voltage waveform where the flyback voltage and the back electromotive force voltage are cancelled from each other. In an initial stage of the first quadrant, the back electromotive force voltage is generated by the rotation of the motor. However, simultaneously, because all the switching elements are turned off in a last stage of a preceding fourth quadrant, the flyback voltage is induced by the coil 124Y in a direction opposite to that of the preceding current application and then a shift to the high-dissipation period is performed. By this flyback voltage, the voltage VMout2 becomes equal to or more than the sum of the power voltage MVdd and the voltage drop Vf in the diode's forward direction and is clamped by the diode. Further, the voltage VMout3 becomes equal to or less than the voltage drop Vf in the diode's forward direction and is clamped by the diode. The voltage values of the voltage VMout2 and the voltage VMout3 are continued for a predetermined period. Thus, a current path is formed to cause current to flow from the ground 142 through the coil 124Y back to the DC power source 140.

Thereafter, if a predetermined period has passed, the H-bridge circuit 20Y transfers the high-side switching element in the direction of the coil current IMY and the low-side switching element in a direction opposite to the direction to the low-dissipation mode, as the conduction state. The current path is formed to cause current to flow from the ground 142 through the coil 124Y back to the DC power source 140, so that the absolute value of the coil current IMY is decreased until it becomes 0 [mA] and the flyback voltage is cancelled. Thereafter, the H-bridge circuit 20Y of the Y phase is shifted to the free period when the direction of the coil current IMY is reversed and (−IMY) exceeds the minimum current threshold. Therefore, the back electromotive force voltage appears between the connection point Mout2 and the connection point Mout3, by the rotation of the motor. When the back electromotive force voltage of the voltage VMY of the Y phase is zero-crossed, the above-mentioned step S14 is performed and the first quadrant is terminated.

Figure 7:
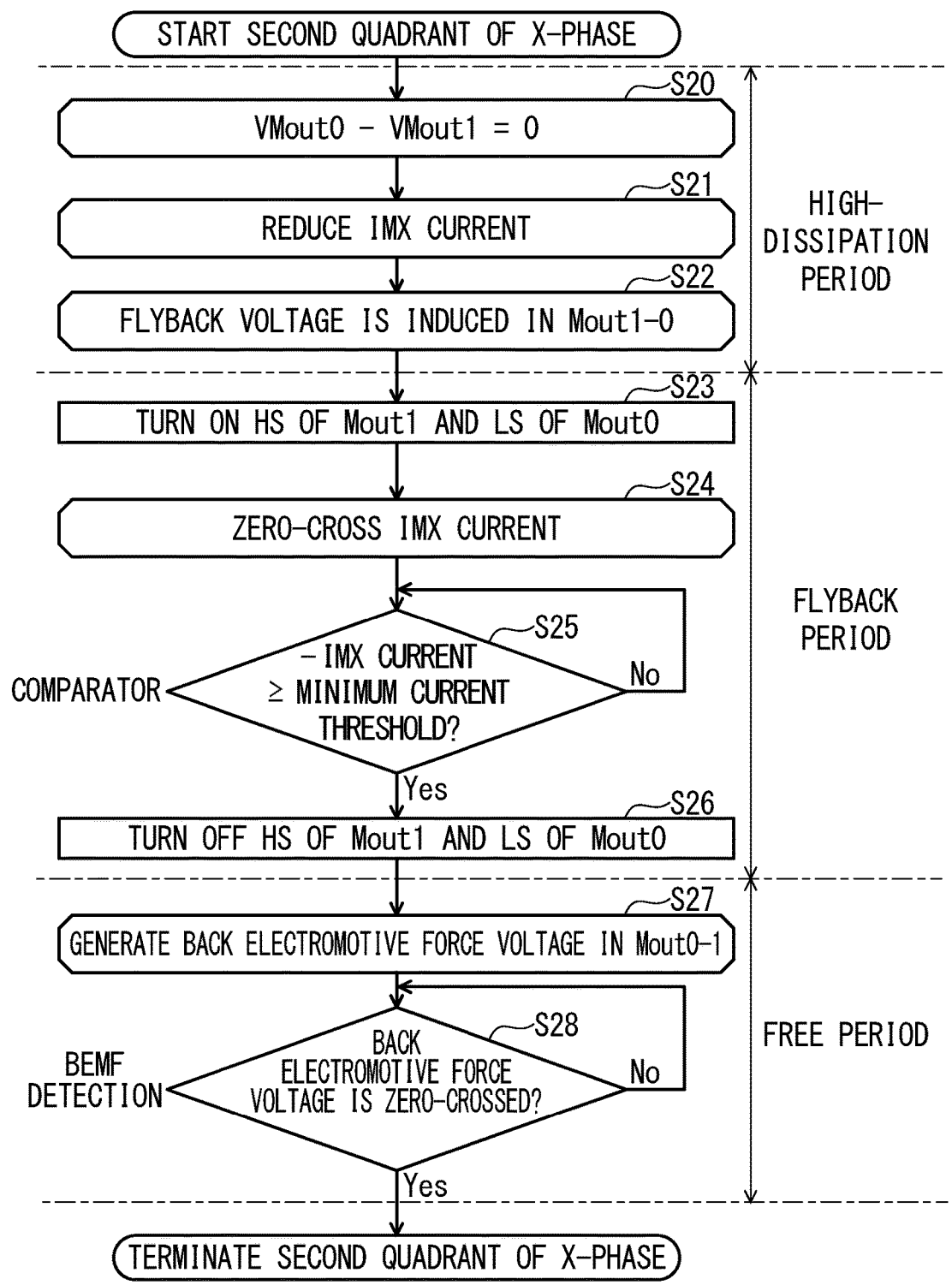
FIG. 7 is a flowchart illustrating the processing of a second quadrant of the X phase of the apparatus for controlling the drive of the motor according to the embodiment.

FIG. 7 is a flowchart illustrating the processing of the second quadrant of the X phase of the apparatus for controlling the drive of the motor according to the embodiment.

In the second quadrant, the H-bridge circuit 20X of the X phase takes a voltage waveform where the flyback voltage and the back electromotive force voltage are cancelled from each other. In an initial stage of the second quadrant, the back electromotive force voltage is generated by the rotation of the motor. However, simultaneously, since all the switching elements 2, 4, 6 and 8 are turned off in a last stage of a preceding first quadrant, the flyback voltage is induced in a direction opposite to that of the preceding current application and then a shift to the high-dissipation period is performed.

In the initial stage of the second quadrant, the H-bridge circuit 20X of the X phase has the voltage VMout0 and the voltage VMout1 which are equal to each other (step S20). Subsequently, energy accumulated in the coil 124X is released and the coil current IMY is reduced (step S21), and then the flyback voltage is induced between the connection point Mout1 and the connection point Mout0 (step S22).

If a predetermined time has passed, the X-phase flyback voltage causes the voltage VMout0 to be equal to or more than the sum of the power voltage MVdd and the voltage drop Vf in the forward direction of the diode 12 and be clamped by the diode 16, and causes the voltage VMout1 to be equal to or less than the voltage drop Vf in the forward direction of the diode 18 and be clamped by the diode 14. The voltage values of the voltage VMout0 and the voltage VMout1 are continued for a predetermined period. Thus, the current path is formed to cause current to flow from the ground 142 through the diode 18, the coil 124X and the diode 12 back to the DC power source 140.

The bridge control circuit 110 turns on the high-side switching element 2 of the leg on the connection point Mout1 and the low-side switching element 8 of the leg on the connection point Mout0 (step S23), and is shifted to the flyback period. In the flyback period, the current path is formed to cause current to flow from the ground 142 through the switching element 8, the coil 124X and the switching element 2 back to the DC power source 140, and the coil current IMX is decreased at high speed until it becomes 0 [mA]. This is referred to as the low-dissipation mode and is lower in dissipation than the high-dissipation mode.

In the flyback period, the bridge control circuit 110 performs the zero-cross of the coil current IMX (step S24) and then determines whether the current (–IMX) is equal to or more than the minimum current threshold (step S25). If the current (–IMX) is equal to or more than the minimum current threshold (Yes in step S25), the bridge control circuit 110 turns off the high-side switching element 2 of the leg on the connection point Mout1 and the low-side switching element 8 of the leg on the connection point Mout0 (step S26) and is shifted to the free period. If the bridge control circuit 110 detects that the coil current IMX flowing in the coil 124 flows in a direction opposite to the charge mode in step S25, the shift to the free period is performed.

In the free period, the back electromotive force voltage appears between the connection point Mout0 and the connection point Mout1 (step S27). The bridge control circuit 110 attempts to detect the zero-cross of the back electromotive force voltage generated in the voltage VMX in the BEMF detector 118 (step S28). If the back electromotive force voltage is zero-crossed (Yes in step S28), the second quadrant is terminated.

The bridge control circuit 110 turns on the high-side switching element 2 of the leg on the connection point Mout1 and the low-side switching element 8 of the leg on the connection point Mout0 (step S23) to be operated in the low-dissipation mode that is lower in dissipation than the high-dissipation mode. Therefore, it is possible to reduce the power dissipation. Further, if the current (–IMX) becomes equal to or more than the minimum current threshold, the bridge control circuit 110 turns off the high-side switching element 2 of the leg on the connection point Mout1 and the low-side switching element 8 of the leg on the connection point Mout0 and terminates the low-dissipation mode. Therefore, there is nothing that affects the measurement of the back electromotive force voltage and the detection of the stall of synchronism after the flyback pulse is terminated, so that the brake does not occur for the motor 120.

In the second quadrant, the H-bridge circuit 20Y of the Y phase performs an operation corresponding to the X-phase operation mode of FIG. 6. That is, the H-bridge circuit 20Y of the Y phase turns on the high-side switching element of the leg on the connection point Mout2 and the low-side switching element of the leg on the connection point Mout3 (corresponding to step S10 of FIG. 6) and applies current. A difference between the voltage VMout2 and the voltage VMout3 becomes the voltage MVdd (corresponding to step S11 of FIG. 6). At this time, current flows from the connection point Mout2 to the connection point Mout3, so that the motor 120 rotates and the absolute value of the coil current IMY gradually increases (corresponding to step S12 of FIG. 6).

Here, if the back electromotive force voltage generated in the X-phase voltage VMX is zero-crossed (corresponding to Yes in step S13 of FIG. 6), the high-side switching element of the leg on the connection point Mout2 of the Y phase and the low-side switching element of the leg on the connection point Mout3 thereof are turned off (corresponding to step S14 of FIG. 6), and the Y phase is shifted to the high-dissipation period. The voltage VMout2 of the Y phase momentarily becomes equal to the voltage VMout3 (corresponding to step S15 of FIG. 6), so that the second quadrant is terminated.

In the embodiment, since the comparator 114 for a micro-step current control, the D/A converter 115 and the current detector 116 are used to detect the termination of the flyback, this may be implemented without increasing cost. Even if the power voltage MVdd, the load torque or the rotating speed is changed, the power dissipation or the brake does not occur.

According to the embodiment, it is possible to detect a timing of terminating the flyback pulse and to turn the switching element off in this timing. Therefore, it does not affect the measurement of the back electromotive force voltage and the detection of the stall of synchronism after the flyback pulse is terminated. Further, since the brake does not occur for the motor 120, it does not adversely affect the maximum-speed performance of the motor.

The present invention is not limited to the above-mentioned embodiments and may be modified without departing from the gist thereof. For example, the following modifications (a) to (i) are possible.

(a) The present invention is not limited to a two-phase stepping motor and may use any phase of motor, e.g. a three-phase stepping motor. Further, a brushless motor whose motor coil is a star connection or a delta connection may be used. (b) The switching element is not limited to the MOSFET, and may be any kind of semiconductor switch element.

(c) At least some of respective components of the drive control apparatus may be processed not by hardware but by software.

(d) At least a part of the drive control apparatus may be an integrated circuit (IC).

(e) The circuit block configuration of the drive control apparatus shown in FIGS. 1 and 2 is the specific example and is not limited thereto.

(f) The control flow shown in FIGS. 6 and 7 is one example, and is not limited to these steps, for example, other steps may be inserted between the steps.

(g) The transfer from the high-dissipation mode to the low dissipation mode is not limited to the elapse of a predetermined time, and may be performed by the zero-cross of the flyback voltage.

(h) The H-bridge circuit of the present invention may be non-restrictively formed by combining half bridges with each other.

As described with reference to the embodiments, according to the present invention, there are provided a motor controller and a method for controlling a motor having capability to allow the current discharged to the ground to return to the power source, thus making it possible to reduce the power dissipation.

What is claimed is:

1. A motor controller comprising:
    an H bridge circuit having switching elements, fly-wheel diodes, and half bridges connected to motor coils provided in the motor;
    a current detector that detects motor current flowing in the motor coil;
    a zero-cross detector that detects a zero-cross of a back electromotive force voltage of each of the motor coils; and
    a controller that operates to control the H bridge circuit to operate in one of operation modes including a charge mode, a high-dissipation mode, a low-dissipation mode and a free mode by activating the switching elements of the H bridge based on the motor current detected by the current detector,
    wherein the H bridge circuit increases the motor current flowing in each of the motor coils in the charge mode,
    wherein the H bridge circuit operates with high energy dissipation and a flyback pulse of each of the motor coils is induced in the high-dissipation mode,
    wherein the H bridge circuit operates with low energy dissipation that is lower than in the high-dissipation mode in the low-dissipation mode,
    wherein the H bridge circuit operates to allow the zero-cross detector to detect the zero-cross of the back electromotive force voltage of each of the motor coils after the flyback pulse of each of the motor coils is decreased,
    wherein the controller further operates to perform a process including:
    controlling the H bridge circuit to switch to the charge mode;
    controlling the H bridge circuit to switch to the high-dissipation mode when the zero-cross detector detects that the back electromotive force voltage of the motor coil connected to a phase of the H bridge circuit shortly before the H bridge circuit is zero-crossed;
    controlling the H bridge circuit to switch to the low-dissipation mode after a predetermined time has elapsed; and
    controlling the H bridge circuit to switch to the free mode when the motor current detector detects that the motor current flowing in the motor coil connected to the H bridge circuit flows in a direction opposite to that in the charge mode.

2. The motor controller according to claim 1,
    wherein, in the low-dissipation mode, the controller sets one of high-side switching elements located in a direction where the motor current flows and one of low-side switching elements located in a direction opposite to the direction to which the motor current flows, among the switching elements of the H bridge circuit, to a conduction state, and causes current to flow in a closed circuit by energy accumulated in the motor coil, the closed circuit being formed by the high-side switching element and the low-side switching element that are in the conduction state.

3. The motor controller according to claim 1,
    wherein, in the high-dissipation mode, the controller sets all of the switching elements of the H bridge circuit to a non-conduction state, thus causing current to flow in a closed circuit by energy accumulated in the motor coil, the closed circuit being formed by a high-side fly-wheel diode located in the direction where the motor current flows and a low-side fly-wheel diode located in the direction opposite to that where the motor current flows.

4. The motor controller according to claim 1,
    wherein the switching elements and the fly-wheel diodes included in the H bridge circuit are of a CMOS type.

5. The motor controller according to claim 1,
    wherein the current detector includes a current mirror circuit and a comparator.

6. A method for controlling a motor with a motor controller including:
    an H bridge circuit having switching elements, fly-wheel diodes, and half bridges connected to motor coils provided in the motor;
    a current detector that detects motor current flowing in the motor coil;
    a zero-cross detector that detects a zero-cross of a back electromotive force voltage of each of the motor coils; and
    a controller that operates to control the H bridge circuit to operate in one of operation modes including a charge mode, a high-dissipation mode, a low-dissipation mode and a free mode by activating the switching elements of the H bridge based on the motor current detected by the current detector,
    wherein the H bridge circuit increases the motor current flowing in each of the motor coils in the charge mode,
    wherein the H bridge circuit operates with high energy dissipation and a flyback pulse of each of the motor coils is induced in the high-dissipation mode,
    wherein the H bridge circuit operates with low energy dissipation that is lower than in the high-dissipation mode in the low-dissipation mode,
    wherein the H bridge circuit operates to allow the zero-cross detector to detect the zero-cross of the back electromotive force voltage of each of the motor coils after the flyback pulse of each of the motor coils is decreased,
    wherein the method comprises:
    controlling the H bridge circuit to switch to the charge mode;
    controlling the H bridge circuit to switch to the high-dissipation mode when the zero-cross detector detects that the back electromotive force voltage of the motor coil connected to a phase of the H bridge circuit shortly before the H bridge circuit is zero-crossed;
    controlling the H bridge circuit to switch to the low-dissipation mode after a predetermined time has elapsed; and
    controlling the H bridge circuit to switch to the free mode when the motor current detector detects that the motor current flowing in the motor coil connected to the H bridge circuit flows in a direction opposite to that in the charge mode.

* * * * *